United States Patent
Ge et al.

(10) Patent No.: US 12,532,195 B2
(45) Date of Patent: Jan. 20, 2026

(54) COMMUNICATION METHOD AND APPARATUS

(71) Applicant: HUAWEI TECHNOLOGIES CO., LTD., Shenzhen (CN)

(72) Inventors: Cuili Ge, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 573 days.

(21) Appl. No.: 18/154,327

(22) Filed: Jan. 13, 2023

(65) Prior Publication Data

US 2023/0171618 A1  Jun. 1, 2023

Related U.S. Application Data

(63) Continuation of application No. PCT/CN2021/102646, filed on Jun. 28, 2021.

(30) Foreign Application Priority Data

Jul. 13, 2020  (CN) .......................... 202010670931.8

(51) Int. Cl.
- *H04W 24/02*  (2009.01)
- *H04W 12/06*  (2021.01)
- *H04W 84/04*  (2009.01)

(52) U.S. Cl.
CPC ........... *H04W 24/02* (2013.01); *H04W 12/06* (2013.01); *H04W 84/042* (2013.01)

(58) Field of Classification Search
CPC ... H04W 24/02; H04W 12/06; H04W 84/042; H04W 48/16; H04W 84/02
See application file for complete search history.

(56) References Cited

U.S. PATENT DOCUMENTS

2020/0359218 A1*  11/2020  Lee .................. H04W 12/63
2021/0075892 A1*  3/2021  Chun .................. H04L 67/141

FOREIGN PATENT DOCUMENTS

| CN | 111158949 A | 5/2020 |
| WO | 2020033334 A1 | 2/2020 |

OTHER PUBLICATIONS

Huawei et al, "ACR when roaming to another PLMN", 3GPP TSG-SA WG6 Meeting #40-e S6-202184, Nov. 12, 2020, total 3 pages.

(Continued)

*Primary Examiner* — Brandon J Miller
(74) *Attorney, Agent, or Firm* — HAUPTMAN HAM, LLP

(57) ABSTRACT

A communication method includes receiving, by a first edge configuration server (ECS), a public land mobile network (PLMN) identifier of a second network from a first device, wherein the first device includes a terminal device or a first edge enabler server (EES). The communication method further includes sending, by the first ECS, first request information to a second ECS based on the PLMN identifier. The communication method further includes receiving, by the first ECS, the information of the second EES from the second ECS. The first request information is useable for requesting information of a second EES. A first network is a home network of the terminal device. The first ECS and the first EES correspond to the first network. The second network is a serving network of the terminal device. The second ECS and the second EES correspond to the second network.

20 Claims, 7 Drawing Sheets

(56) References Cited

OTHER PUBLICATIONS

Huawei et al, "ACR when roaming to another PLMN", 3GPP TSG-SA WG6 Meeting #40-e S6-202185, Nov. 12, 2020, total 6 pages.
Huawei et al, "3GPP Technical Specification Group Services and System Aspects Architecture for enabling Edge Applications", 3GPP TS 23.558 V0.2.0, Apr. 17, 2020, total 55 pages.
Qualcomm Incorporated, "Pseudo-CR on removal of Edge Hosting Environment terminology", 3GPP TSG-SA WG6 Meeting #37-e S6-200678, May 7, 2020, total 3 pages.
International Search Report issued in corresponding International Application No. PCT/CN2021/102646, dated Sep. 17, 2021, pp. 1-11.
Samsung, Solution 2 update and conclusion for Key Issue #1 and #7. 3GPP TSG-SA WG6 Meeting #34, Reno, Nevada, US Nov. 11-15, 2019, S6-192113, 5 pages.
Extended European Search Report issued in corresponding European Application No. 21842630.2, dated Nov. 9, 2023, pp. 1-15.
Ericsson LM, Huawei, Hisilicon, Multi-server MBMS bearer coordination. 3GPP TSG-SA6 Meeting #19, Dubrovnik, Croatia, Oct. 9, 2017-Oct. 13, 2017, S6-171601, 10 pages.
3GPP TS 23.558 V0.3.0 (Jun. 2020), 3rd Generation Partnership Project; Technical Specification Group Services and System Aspects; Architecture for enabling Edge Applications; (Release 17), 70 pages.

\* cited by examiner

COMMUNICATION METHOD AND APPARATUS

CROSS-REFERENCE TO RELATED APPLICATION

This application is a continuation of International Patent Application No. PCT/CN2021/102646, filed on Jun. 28, 2021, which claims priority to Chinese Patent Application No. 202010670931.8, filed on Jul. 13, 2020, the disclosures of the aforementioned applications are hereby incorporated by reference in their entireties.

TECHNICAL FIELD

One or more embodiments of this application relate to the field of communication technologies, and in particular, to a communication method and an apparatus.

BACKGROUND

Multi-access edge computing (MEC) can provide a nearby telecommunication user with a required information technology (IT) service and cloud computing function by using the radio access network, to create a carrier-class service environment with high performance, a low latency, and a high bandwidth. This accelerates fast downloading of content, services, and applications in a network and allows a user to have uninterrupted high-quality network experience.

Roaming may be caused due to movement of a terminal device. For example, the terminal device moves from Beijing to Shanghai. In this case, the terminal device is to be handed over from a home (home) public land mobile network (PLMN) in Beijing to a visited (visited) PLMN in Shanghai. How a terminal device obtains information about an edge enabler server (EES) corresponding to a visited PLMN is a technical problem to be resolved in one or more embodiments of this application.

SUMMARY

One or more embodiments of this application provide a communication method and an apparatus, so that a terminal device can obtain EES information corresponding to a visited PLMN.

According to a first aspect, a communication method is provided. The method is performed by a first ECS. It may be understood that the first ECS may be a first ECS, or may be a component (for example, a chip, a circuit, or the like) configured in the first ECS. The method includes: The first ECS receives a PLMN identifier of a second network from a first device; the first ECS sends first request information to a second ECS based on the PLMN identifier, where the first request information is for requesting information about a second EES corresponding to the second network; and the first ECS receives the information about the second EES from the second ECS, where the first device is a terminal device or a first EES, a home network of the terminal device is a first network, the first ECS and the first EES correspond to the first network, the second network is a serving network of the terminal device, and the second ECS and the second EES correspond to the second network.

In some embodiments, the first ECS may replace the first device to interact with the second ECS, to learn of information about a V-EES corresponding to the second network. This simplifies logic of discovering signaling of the EES corresponding to the second network by the first device in a roaming scenario. In addition, according to the foregoing method, the first device does not need to sense information about the second ECS. Therefore, when the first device roams to a plurality of networks, problems, such as a high requirement on the terminal device, complex edge service access authorization and authentication of the first device, difficult control, and complex implementation logic, that are caused by that the first device senses information about second ECSs of the plurality of networks are resolved.

In some embodiments, the first ECS receives, from the first device, one or both of location information of the terminal device in the second network and application information of the terminal device.

In some embodiments, the first request information includes one or both of the location information of the terminal device in the second network and the application information of the terminal device.

In some embodiments, the information about the second EES includes address information of the second EES that matches the first request information or identification information of the second EES, and the method further includes: The first ECS sends the information about the second EES to the first device.

In some embodiments, after receiving the first request information, the second ECS may determine whether there is information about a V-EES that matches the first request information. If the information about the V-EES exists, the information about the V-EES is directly sent to the first device. Then, the first device may directly initiate an EAS initiation process. In this way, operations of the first device can be simplified.

In some embodiments, the method further includes: The first ECS receives, from the second ECS, a security credential for accessing the second EES; and the first ECS sends the security credential of the second EES to the first device.

In some embodiments, the first device accesses the second EES by using the security credential of the second EES, so that security of accessing the second EES can be improved, and information leakage of the second EES caused by that a fake first device accesses the second EES is avoided.

In some embodiments, the information about the second EES indicates that the second EES that matches the first request information exists, and the method further includes: The first ECS sends information about the second ECS to the first device.

In some embodiments, after receiving the first request information, the second ECS may determine whether a second EES that matches second request information exists. If the second EES that matches the second request information exists, the information about the second ECS is returned to the first ECS, and then the first ECS feeds back the information about the second ECS to the first device. However, the first device may request the information about the second EES from the first ECS, to avoid leakage of a topology structure of the V-EES.

In some embodiments, the method further includes: The first ECS receives, from the second ECS, a security credential for accessing the second ECS; and the first ECS sends the security credential of the second ECS to the first device.

In some embodiments, the first device accesses the second ECS by using the security credential, so that information security of the second ECS can be protected.

In some embodiments, the information about the second EES indicates that the second EES that matches the first request information does not exist, and the method further includes: The first ECS sends first information to the terminal device, where the first information is obtained from the second ECS or locally configured, and the first information is for obtaining an endpoint of an application.

In some embodiments, when the second EES that matches the first request information does not exist, the first ECS may alternatively return the first information to the first device. The first information may be information about a central cloud platform or a DNS server of a central cloud platform. Finally, the central cloud platform or the server of the central cloud platform provides a service for the first device, to ensure that a corresponding service may also be provided for the first device in a case in which no matched second EES exists.

According to a second aspect, a communication method is provided. The method is performed by a first device. It may be understood that the first device may be a terminal device or a first EES, the terminal device may be a terminal device or a component (for example, a chip, a circuit, or the like) configured in the terminal device, and the first EES may be a first EES or a component configured in the first EES. The method includes: The first device sends a public land mobile network PLMN identifier of a second network to a first edge configuration server ECS, where the PLMN identifier is for confirming information about a second ECS; and the first device receives information about a second edge enabler server EES, where the first device includes the terminal device or the first EES, a home network of the terminal device is a first network, the first EES and the first ECS correspond to the first network, the second network is a serving network of the terminal device, and the second ECS and the second EES correspond to the second network.

In some embodiments, when the terminal device roams and is handed over from the first network to the second network, the terminal device may successfully obtain the information about the second EES corresponding to the second network.

In some embodiments, the method further includes: The first device sends one or both of the following information to the first ECS: location information of the terminal device in the second network and application information of the terminal device.

In some embodiments, the information about the second EES includes address information of the second EES that matches first request information, and that the first device receives information about a second EES includes: The first device receives, from the first ECS, the address information of the second EES, identification information of the second EES, or the like.

In some embodiments, the method further includes: The first device receives, from the first ECS, a security credential for accessing the second EES.

In some embodiments, the information about the second EES indicates that the second EES that matches the first request information exists; and that the first device receives information about a second EES includes: The first device receives the information about the second ECS from the first ECS; the first device sends second request information to the second ECS, where the second request information is for requesting the information about the second EES; and the terminal device receives the information about the second EES from the second ECS, where the information about the second EES includes address information of the second EES that matches the first request information or identification information of the second EES.

In some embodiments, the method further includes: The first device receives, from the first ECS, a security credential for accessing the second ECS.

In some embodiments, the information about the second EES indicates that the second EES that matches the first request information does not exist, and the method further includes: The first device receives first information from the first ECS, where the first information is for obtaining an endpoint of an application.

In some embodiments, the first device is the first EES, and the method further includes: The first EES receives third request information from the terminal device, where the third request information includes the PLMN identifier of the second network.

According to a third aspect, a communication method is provided. The method is performed by a second ECS. It may be understood that the second ECS may be a second ECS or a component (for example, a chip, a circuit, or the like) configured in the second ECS. The method includes: The second ECS receives first request information from a first ECS, where the first request information is for requesting information about a second edge enabler server EES corresponding to a second network; and the second ECS sends the information about the second EES to the first ECS, where the second ECS and the second EES correspond to the second network, the first ECS corresponds to a first network, the first network is a home network of a terminal device, and the second network is a serving network of the terminal device.

In some embodiments, the first request information includes one or both of location information of the terminal device in the second network and application information of the terminal device.

In some embodiments, the information about the second EES includes address information of the second EES that matches the first request information, identification information of the second EES, or the like.

In some embodiments, the method further includes: The second ECS sends, to the first ECS, a security credential for accessing the second EES.

In some embodiments, the information about the second EES indicates whether a second EES that matches the first request information exists.

In some embodiments, the method further includes: The second ECS sends, to the first ECS, a security credential for accessing the second ECS.

In some embodiments, the information about the second EES indicates that the second EES that matches the first request information does not exist, and the method further includes: The second ECS sends first information to the first ECS, where the first information is for obtaining an endpoint of an application.

According to a fourth aspect, an embodiment of this application provides an apparatus. For beneficial effects, refer to descriptions in the first aspect. The apparatus has a function of implementing the behavior in the method embodiment in the first aspect. The function may be implemented by executing corresponding hardware or software. The hardware or the software may include one or more units corresponding to the foregoing functions. In some embodiments, the apparatus may include: a communication unit, configured to receive a public land mobile network PLMN identifier of a second network from a first device, where the first device includes a terminal device or a first edge enabler server EES; and a processing unit, configured to send first request information to a second ECS based on the PLMN identifier, where the first request information is for requesting information about a second EES corresponding to the second network. The communication unit is further configured to receive the information about the second EES from the second ECS. A home network of the terminal device is a first network, a first ECS and the first EES correspond to the first network, the second network is a serving network of the terminal device, and the second ECS and the second EES correspond to the second network. These units may perform the corresponding functions in the method example in the first aspect. For details, refer to the detailed descriptions in the method example. Details are not described herein again.

According to a fifth aspect, an embodiment of this application further provides an apparatus. For beneficial effects, refer to descriptions in the second aspect. The apparatus has a function of implementing the behavior in the method embodiment in the second aspect. The function may be implemented by executing corresponding hardware or software. The hardware or the software may include one or more units corresponding to the foregoing functions. In some embodiments, the apparatus includes a communication unit, configured to send a public land mobile network PLMN identifier of a second network to a first edge configuration server ECS, where the PLMN identifier is for confirming information about a second ECS. The communication unit is further configured to receive information about a second edge enabler server EES. A first device includes a terminal device or a first EES, a home network of the terminal device is a first network, the first EES and the first ECS correspond to the first network, the second network is a serving network of the terminal device, and the second ECS and the second EES correspond to the second network. These units may perform the corresponding functions in the method example in the second aspect. For details, refer to the detailed descriptions in the method example. Details are not described herein again.

According to a sixth aspect, an embodiment of this application further provides an apparatus. For beneficial effects, refer to descriptions in the third aspect. The apparatus has a function of implementing the behavior in the method embodiment in the third aspect. The function may be implemented by executing corresponding hardware or software. The hardware or the software may include one or more units corresponding to the foregoing functions. In some embodiments, the apparatus includes a communication unit, configured to receive first request information from a first ECS, where the first request information is for requesting information about a second edge enabler server EES corresponding to a second network. The communication unit is further configured to send the information about the second EES to the first ECS. A second ECS and the second EES correspond to the second network, the first ECS corresponds to a first network, the first network is a home network of a terminal device, and the second network is a serving network of the terminal device. These units may perform the corresponding functions in the method example in the third aspect. For details, refer to the detailed descriptions in the method example. Details are not described herein again.

According to a seventh aspect, an apparatus is provided. The apparatus may be the first ECS in the method embodiment of the first aspect, or may be a chip disposed in the first ECS. The apparatus includes a communication interface and a processor. In some embodiments, the communication apparatus further includes a memory. The memory is configured to store a computer program or instructions. The processor is coupled to the memory and the communication interface. When the processor executes the computer program or the instructions, the apparatus is enabled to perform the method performed by the first ECS in the method embodiment of the first aspect.

According to an eighth aspect, an apparatus is provided. The apparatus may be the first device in the method embodiment of the second aspect, or may be a chip disposed in the first device. The apparatus includes a communication interface and a processor. In some embodiments, the communication apparatus further includes a memory. The memory is configured to store a computer program or instructions. The processor is coupled to the memory and the communication interface. When the processor executes the computer program or the instructions, the apparatus is enabled to perform the method performed by the first device in the method embodiment in the second aspect.

According to a ninth aspect, an apparatus is provided. The apparatus may be the second ECS in the method embodiment of the third aspect, or may be a chip disposed in the second ECS. The apparatus includes a communication interface and a processor. In some embodiments, the communication apparatus further includes a memory. The memory is configured to store a computer program or instructions. The processor is coupled to the memory and the communication interface. When the processor executes the computer program or the instructions, the apparatus is enabled to perform the method performed by the second ECS in the method embodiment in the third aspect.

According to a tenth aspect, a computer program product is provided. The computer program product includes computer program code. When the computer program code is run, the method performed by the first ECS in the first aspect is performed.

According to an eleventh aspect, a computer program product is provided. The computer program product includes computer program code. When the computer program code is run, the method performed by the first device in the second aspect is performed.

According to a twelfth aspect, a computer program product is provided. The computer program product includes computer program code. When the computer program code is run, the method performed by the second ECS in the third aspect is performed.

According to a thirteenth aspect, this application provides a chip system. The chip system includes a processor, configured to implement the function of the first ECS in the method of the first aspect. In some embodiments, the chip system further includes a memory, configured to store program instructions and/or data. The chip system may include a chip, or may include a chip and another discrete component.

According to a fourteenth aspect, this application provides a chip system. The chip system includes a processor, configured to implement the function of the first device in the method of the second aspect. In some embodiments, the chip system further includes a memory, configured to store program instructions and/or data. The chip system may include a chip, or may include a chip and another discrete component.

According to a fifteenth aspect, this application provides a chip system. The chip system includes a processor, configured to implement the function of the second ECS in the method of the third aspect. In some embodiments, the chip system further includes a memory, configured to store program instructions and/or data. The chip system may include a chip, or may include a chip and another discrete component.

According to a sixteenth aspect, this application provides a computer-readable storage medium. The computer-readable storage medium stores a computer program. When the computer program is run, the method performed by the first ECS in the first aspect is implemented.

According to a seventeenth aspect, this application provides a computer-readable storage medium. The computer-readable storage medium stores a computer program. When the computer program is run, the method performed by the first device in the second aspect is implemented.

According to an eighteenth aspect, this application provides a computer-readable storage medium. The computer-readable storage medium stores a computer program. When the computer program is run, the method performed by the second ECS in the third aspect is implemented.

DETAILED DESCRIPTION

The following describes the technical solutions in embodiments of this application with reference to the accompanying drawings in embodiments of this application. In the descriptions of this application, unless otherwise specified, "I" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

In addition, a network architecture and a service scenario that are described in embodiments of this application are intended to describe the technical solutions in embodiments of this application more clearly, and do not constitute a limitation on the technical solutions provided in embodiments of this application. A person of ordinary skill in the art may learn that with evolution of the network architecture and emergence of a new service scenario, the technical solutions provided in embodiments of this application are also applicable to similar technical problems.

Figure 1:
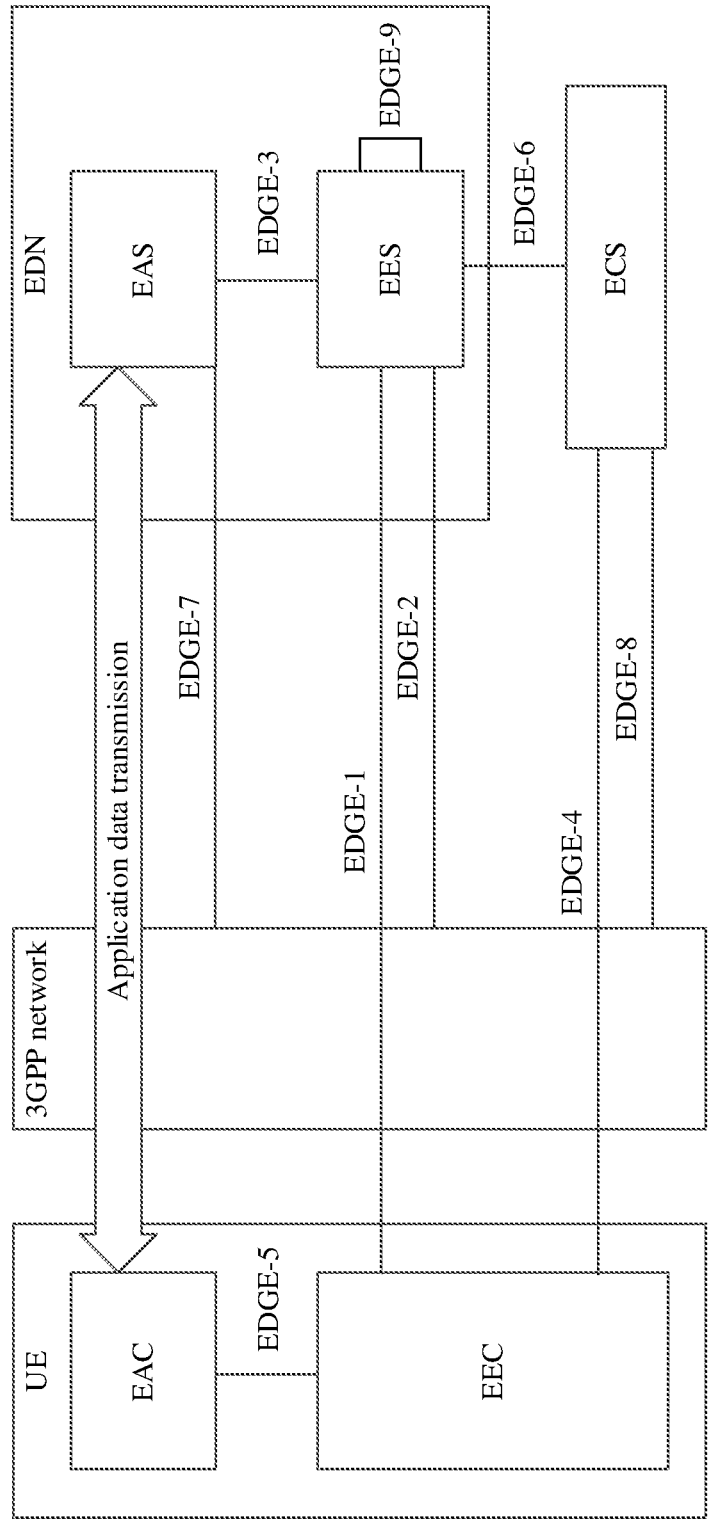
FIG. 1 is an architecture of an MEC network according to at least an embodiment of this application.

As shown in FIG. 1, the following architecture model is defined in research on multi-access edge computing (MEC) of SA6 of the 3rd Generation Partnership Project (3GPP).

Edge data network (EDN): In one understanding, an EDN corresponds to only one data network, is a special local data network (local DN), includes an edge enabler function, may be identified by using a data network access identifier (DNAI) and a data network name (DNN), and is a network logical concept. In another understanding, the EDN is an equivalent concept of a central cloud, may be understood as a local data center (a geographical location concept), may be identified by using a DNAI, and may include a plurality of local data networks (local DNs). For example, an application program "AppGallery" in a Huawei phone is used as an example. A central cloud of the "AppGallery" may be set at the headquarters in Shenzhen. To facilitate use of users in Beijing and Shanghai, local EDN networks of the "AppGallery" may be set in Beijing and Shanghai respectively. Subsequently, a user in Beijing can obtain an application service through the local EDN network of the "AppGallery" set in Beijing. A user in Shanghai can obtain an application service through the local EDN network of the "AppGallery" set in Shanghai. Each EDN network provides application services for users nearby, to provide users with better network experience.

Application instance or edge application: An application deployed in the EDN is called an application instance. The application instance is specifically an instance (instance) of a server application program, for example, social media software, augmented reality (augmented reality, AR), or virtual reality (VR) that is deployed and run on the EDN. One application may have one or more edge application servers (EASs) deployed in one or more EDNs. EASs deployed and running in different EDNs may be considered as different EASs of one application. The EASs may share a domain name, and may use an anycast IP address, or may use different IP addresses. This is not limited. The EAS is also referred to as an application instance, an edge application instance, an MEC application server, an EAS function, or the like.

An edge application client (EAC) is a peer entity of the EAS on a terminal device side. The EAC is used by an application user to obtain an application service from the EAS. The EAC is a client program of an application on a terminal side. The EAC may be connected to an EAS on a central cloud to obtain an application service, or may be connected to an EAS deployed and running in one or more EDNs to obtain an application service.

An edge enabler server (EES) can provide an enabler capability for an instance deployed in an EDN, to better support deployment of an application in MEC. For example, the EES can support registration of an edge application, support authentication and authorization of a terminal device, and provide IP address information of an application instance for the terminal device. The EES can further obtain an identifier and IP address information of the application instance, and can further send the identifier and the IP address information of the application instance to an ECS. The EES is deployed in the EDN. Usually, an EAS is registered to an EES, or information about the EAS is configured on the EES by using a management system. The EES is referred to as an EES associated with the EAS. The EES may control, manage, register, or configure the EAS associated with the EES.

An edge enabler client (EEC) is a peer entity of the EES on a terminal device side. The EEC is configured to: register information about the EEC and information about an application client to the EES, perform security authentication and authorization, obtain an EAS IP address from the EES, and provide an edge computing enabler capability for the application client. For example, the EEC uses an EAS discovery service to return the EAS IP address to the application client.

An edge configuration server (ECS) is responsible for EDN configuration, for example, providing EES information for a terminal device. The ECS may further provide information about an application instance for the terminal device, and interact with a DNS of an application to obtain the information about the application instance. Further, the ECS may obtain the information about the application instance, information about an IP address, and the like from another functional entity and store the information.

The application user may sign a service agreement with an application provider, so that a service is provided for the application user. The application user logs in to the application client on the terminal device, and performs communication through a connection between the application client and the EAS. An enabler client (for example, the EEC) may be a middleware layer, and is usually located in an operating system, or is located between an application client and the operating system, or may be implemented inside the application client. The application client may obtain an edge enabler service from the enabler client through an application programming interface (application programming interface, API).

Figure 2:
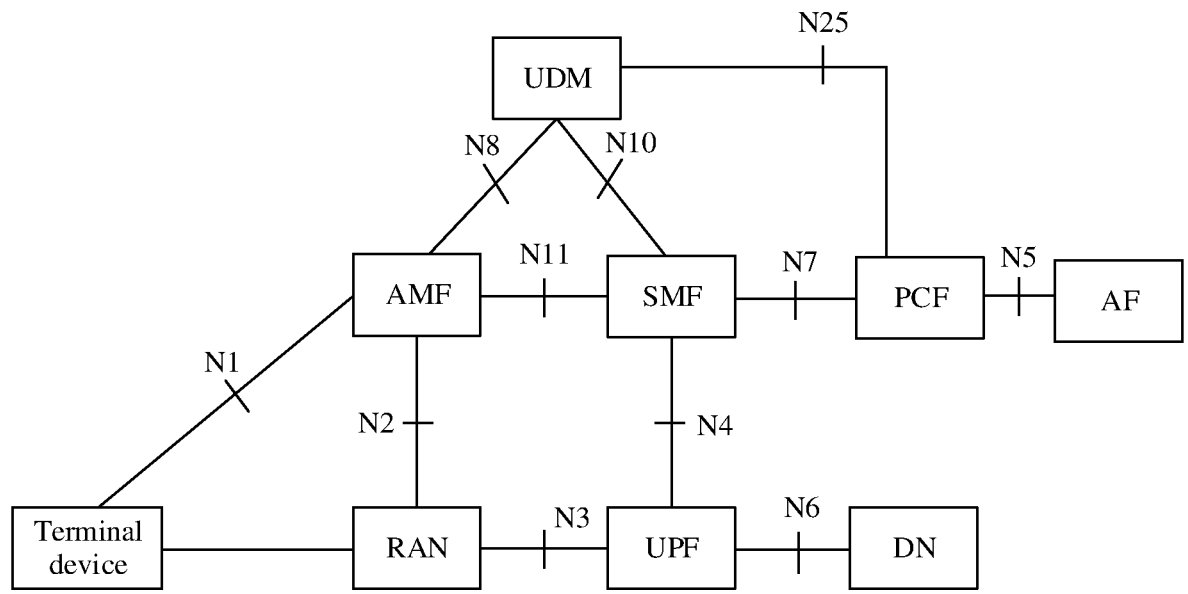
FIG. 2 is an architecture of a wireless network according to at least an embodiment of this application.

As shown in FIG. 2, a network architecture defined in the 3GPP standard TS 23.501 is as follows, including a radio access network (RAN) and a core network. Different access network devices may be connected to each other through an Xn interface. The access network device may be connected to the core network through an NG interface.

The RAN is configured to implement a function related to radio access. For example, the RAN may provide a terminal device with functions such as radio resource management, quality of service management, and data encryption and compression. For example, the access network device may include the following types.

1. A next generation node (gNB) provides the terminal device with a protocol and a function on a control plane and/or a user plane of a new radio (new radio, NR), and accesses a core network, for example, a 5G core (5GC) network.

2. A next generation evolved node (ng-eNB) provides the terminal device with a protocol and a function on a control plane and/or a user plane of evolved universal terrestrial radio access (E-UTRA), and accesses the core network, for example, the 5GC.

In some embodiments In some embodiments, the access network device may include a central unit (central unit, CU) and a distributed unit (DU). In other words, functions of an original access network device may be split. Some functions of the original access network device are deployed on the CU, and some remaining functions are deployed on the DU. A plurality of DUs share one CU, to reduce costs and facilitate network expansion. The CU and the DU may be connected through an FI interface. The CU, representing the access network device, may be connected to a core network through an NG interface, or the CU, representing the access network device, may be connected to another access network device through an Xn interface. Further, functions of the CU may be classified into the following.

1. A central unit-control plane (CU-CP) mainly includes control planes of an RRC layer and a PDCP layer on the CU.

2. A central unit-user plane (CU-UP) mainly includes user planes of an SDAP layer and a PDCP layer on the CU.

The core network is mainly configured to: manage a terminal device, and provide a function of communicating with an external network. A core network device may include one or more of the following network elements.

A user plane function (UPF) network element is mainly responsible for forwarding and receiving user data. In downlink transmission, the UPF network element may receive user data from a data network (DN), and transmit the user data to the terminal device through the access network device. In uplink transmission, the UPF network element may receive user data from the terminal device through the access network device, and forward the user data to a DN. In some embodiments In some embodiments, transmission resources and scheduling functions in the UPF network element that provide services for the terminal device may be managed and controlled by an SMF network element.

An access and mobility management function (AMF) network element is mainly responsible for mobility management in a mobile network, for example, user location update, registration of a user with a network, and user handover.

The session management function (SMF) network element is mainly responsible for session management in the mobile network, for example, session establishment, modification, and release. For example, specific functions are allocation of an IP address for a user and selection of a UPF network element that provides a packet forwarding function.

A policy control function (PCF) network element mainly supports providing a unified policy framework to control network behavior, and providing a policy rule for a control layer network function, and is responsible for obtaining policy decision-related subscription information of a user.

An application function (AF) network element mainly supports interacting with a 3GPP core network to provide a service, for example, to affect a data routing decision and a policy control function, or provide some third-party services for a network side.

A unified data management (unified data management, UDM) network element is mainly configured to: generate an authentication credential, process a user identifier (for example, store and manage a permanent identity of the user), control access authorization, manage subscription data, and the like.

It should be noted that the network elements in the core network may have different names in different communication systems. In the schematic diagram shown in FIG. 1, a 5th generation mobile communication system is used as an example for description, and this is not intended to limit this application.

In some embodiments, the network architecture shown in FIG. 1 may further include a terminal device. The terminal device may be referred to as a terminal for short, and is a device having a wireless transceiver function. The terminal device may be deployed on land, including being deployed indoor or outdoor or being handheld or vehicle-mounted; may be deployed on water (for example, on a ship); or may be deployed in the air (for example, on a plane, a balloon, or a satellite). The terminal device may be a mobile phone, a tablet computer, a computer having a wireless transceiver function, a virtual reality (VR) terminal device, an augmented reality (AR) terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, a wireless terminal device in a smart home, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as user equipment (UE), an access terminal device, a vehicle-mounted terminal device, a terminal device in industrial control, a UE unit, a UE station, a mobile station, a remote station, a remote terminal device, a mobile device, a wireless communication device, a UE agent, a UE apparatus, or the like. The terminal device may be fixed or mobile. This is not limited in embodiments of this application.

In some embodiments, the network architecture shown in FIG. 1 may further include: a data network (DN). The DN may be a network that provides a data transmission service for a user. For example, the DN may be an IP multimedia service network or an internet. The DN may include a plurality of application servers. The terminal device may establish a protocol data unit (PDU) session from the terminal device to the DN, to access the DN. One data network may have one or more local data networks (Local DNs), and these local data networks are data network access points (access points) close to a user attachment point (point of attachment).

In this embodiment of this application, the ECS, the EES, and the EAS in the architecture shown in FIG. 1 may be configured in the one or more DNs. Alternatively, it may be described as follows. The DN includes one or more EDNs, and each EDN includes an EES and an EAS, and may further include an ECS. In addition, an application central cloud platform may be further configured in the DN. The application central cloud platform and the EAS are equivalent. Each EAS can provide an application service for a nearby user, and the application central cloud platform can provide application services for all users. The application central cloud platform may also be referred to as a central cloud platform. In the following description, the central cloud platform is used as an example for description. The following uses a "HUAWEI Music" client as an example to describe a relationship between the EDN network and the central cloud platform. A central cloud platform about "HUAWEI Music" may be set at the headquarters in Shenzhen. The central cloud platform can provide services for "HUAWEI Music" clients of global users. In addition, to conveniently provide music services for users in Beijing and Shanghai, EASs of HUAWEI Music may be deployed in EDN networks in Beijing and Shanghai. After that, a user in Beijing can access the EAS of HUAWEI Music in the EDN network corresponding to Beijing to obtain a HUAWEI Music service. A user in Shanghai can access the EAS of HUAWEI Music in the EDN network corresponding to Shanghai to obtain a HUAWEI Music service. Further, when the EDN network in Beijing or Shanghai is faulty, or the corresponding EAS of HUAWEI Music is faulty, for example, overloaded, or cannot provide some specific services, the user in Beijing or Shanghai can access the central cloud platform of HUAWEI Music in Shenzhen to obtain a corresponding music service.

Figure 3:
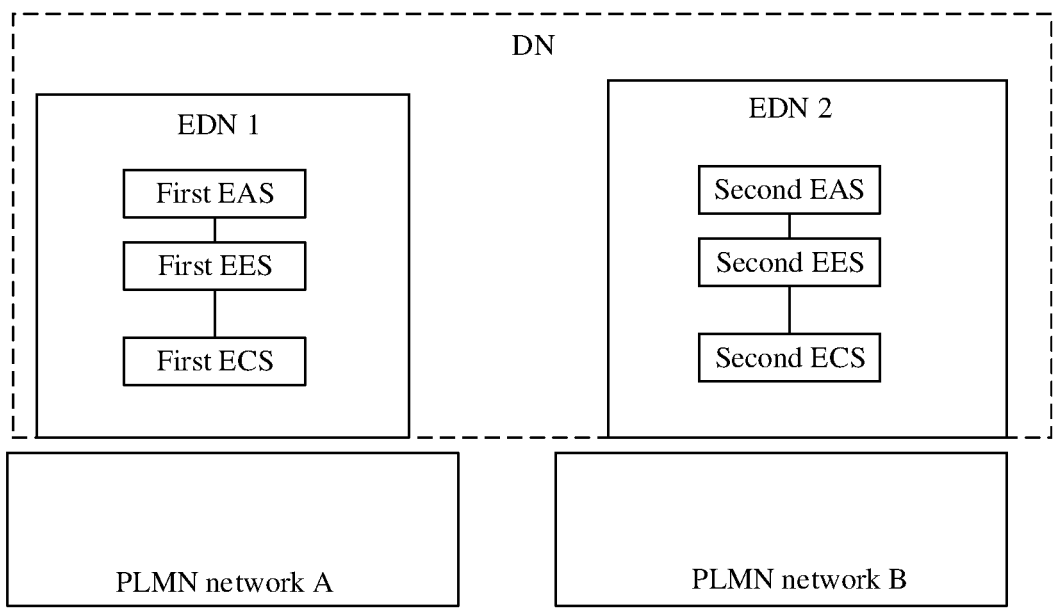
FIG. 3 is a schematic diagram of a PLMN and an EDN network according to at least an embodiment of this application.

Further, in embodiments of this application, one EDN network corresponds to one PLMN, and different PLMNs may correspond to one or more EDN networks. For example, as shown in FIG. 3, a PLMN A corresponds to an EDN 1, and a PLMN B corresponds to an EDN 2. The EDN 1 includes a first EAS and a first EES, and may further include a first ECS. The EDN 2 includes a second EAS and a second EES, and may further include a second ECS. When a terminal device roams from the PLMN A to the PLMN B, how to determine, for the terminal device, the second EES corresponding to the PLMN B is a technical problem to be resolved in embodiments of this application.

For ease of understanding, a scenario in the following embodiment is first described. In the following description, a first network may be a home (home) network of the terminal device, and may be referred to as an H network for short, and a second network may be a visited (Visited) network of the terminal device, and may be referred to as a V network for short, or may be referred to as a serving network. The terminal device may roam from the first network to the second network.

The first ECS corresponds to the first network. This may alternatively be described as follows: The first ECS is deployed in the first network, or the first ECS is an ECS associated with the first network, or the first ECS is an ECS of an operator to which the first network belongs, or the like. The first EES corresponds to the first network. This may alternatively be described as follows: The first EES is deployed at an edge of the first network, or the first EES may belong to the first network operator, or the first EES is an EES that subscribes to the first network operator. The first EAS corresponds to the first network. This may alternatively be described as follows: The first EAS is deployed at an edge of the first network.

The second ECS corresponds to the second network. This may alternatively be described as follows: The second ECS is deployed in the second network, or the second ECS is an ECS associated with the second network, or the second ECS is an ECS of an operator to which the second network belongs, or the like. The second EES corresponds to the second network. This may alternatively be described as follows: The second EES is deployed at an edge of the second network, or the second EES may belong to the second network operator, or the second EES is an EES that subscribes to the second network operator. The second EAS corresponds to the second network. This may alternatively be described as follows: The second EAS is deployed at an edge of the second network, or the like.

In addition, in the following description, information about the second ECS may include address information of the second ECS or identification information of the second ECS. In the following description, the information about the second ECS, the address information of the second ECS, and the identification information of the second ECS are not distinguished from each other, and may be replaced with each other.

In addition, in the following description, information about the second EES may include identification information of the second EES or address information of the second EES.

Embodiments of this application provide a communication method, to resolve the foregoing technical problem of how to determine an EES in an EDN network corresponding to a second network when a terminal device roams from a first network to the second network. The method includes: A first ECS receives a PLMN identifier of the second network from a first device, where the first device may be a terminal device, a first EES, or the like. The first ECS sends first request information to a second ECS based on the PLMN identifier of the second network. The first request information is for requesting information about a second EES corresponding to the second network. After receiving the first request information, the second ECS sends the information about the second EES to the first ECS.

In some embodiments, the method further includes: The first ECS determines information about the second ECS based on the PLMN identifier of the second network. Then, the first ECS sends the first request information to the second ECS based on the information about the second ECS.

In some embodiments, the method further includes: The second ECS determines the information about the second EES based on the first request information. For example, the second ECS determines address information of the second EES or identification information of the second EES based on the first request information; or the second ECS determines, based on the first request information, whether a second EES that matches the first request information exists.

For example, that the second ECS determines the information about the second EES based on the first request information may include any one of the following cases.

(1) The second ECS retrieves, based on application information in the first request information, information about an EES corresponding to the second network. When the information about the EES corresponding to the second network includes information about the application (in other words, the application is registered with the EES corresponding to the second network, or the application is onboard (onboard) or instantiated in the EES corresponding to the second network), the second ECS determines that the second EES that matches the first request information exists.

(2) The second ECS retrieves, based on location information in the first request information, information about an EES corresponding to the second network. When a service area (or a best service area) of the EES corresponding to the second network matches the location information, the second ECS determines that the second EES that matches the first request information exists. For example, the service area or the best service area of the EES may be a group of cell identifiers or tracking area identifiers or a group of DNAI lists corresponding to the service area (service area). For example, the foregoing matching may be understood as: The location information is located in the service area of the EES corresponding to the second network, or an area that overlaps with the service area.

(3) The second ECS retrieves, based on location information and application information in the first request information, information about an EES corresponding to the second network. When a service area of the EES corresponding to the second network matches the location information, and the information about the EES corresponding to the second network includes the application information, the second ECS determines that the second EES that matches the first request information exists.

In some embodiments, the first request information includes one or both of the location information of the terminal device in the second network and the application information of the terminal device. For example, the location information of the terminal device in the second network includes cell information cell ID or tracking area information (tracking area information, TAI) of the terminal device in the second network. The application information of the terminal device indicates application information from UE. The application information may be an application installed on the UE, an application that the UE starts and runs, an application that the UE is to access, an application that the UE is interested in, or the like. The application information of the UE includes an identifier of an application or an identifier of an application client. The identifier of the application is for uniquely identifying one application (application), for example, a fully qualified domain name (FQDN), an EAS ID, or a uniform resource locator (URL). The identifier of the client is for identifying one client of an application on the UE, for example, a package name (package name) of the application client, or an operating system identifier and an application identifier (OSId and APPId). The application information of the UE may further include an application provider (application provider), an application type (application category or application type), for example, an internet of vehicles application, an application description (application description), an application characteristic (application characteristic), a geographical area of operation (geographical area of operation) of the application, a latency (latency) corresponding to the application, a bandwidth (bandwidth) corresponding to the application, and a service continuity requirement (service continuity requirement) corresponding to the application. The application information may alternatively be a triplet, a DNN, or a combination of a DNN and slice information. In a possible implementation solution, when the first device roams from the first network to the second network, the first device may determine the information about the second ECS corresponding to the second network, and request information about a proper second EES from the second ECS. In this way, when the first device moves and roams to a plurality of areas, the first device needs to separately sense address information of ECSs corresponding to networks in the plurality of areas, and interact with the plurality of ECSs for authentication and authorization. Therefore, a requirement on the first device is high, and authorization and authentication of edge service access of the first device are complex and difficult to control, and implementation logic is complex. However, in embodiments of this application, when the first device roams from the first network to the second network, the first ECS corresponding to the first network interacts with the second ECS corresponding to the second network, to obtain the information about the second EES and send the information about the second EES to the first device. In this way, the first device does not need to sense the information about the second ECS, so that a problem that a requirement on the first device is high, and authorization and authentication of edge service access of the first device are complex and difficult to control, and implementation logic is complex can be resolved.

In some embodiments, the first ECS may send the information about the second EES to the first device. In a possible implementation, the information about the second EES may include the address information of the second EES or the identification information of the second EES. If the second ECS determines that the second EES that matches the first request information exists, the second ECS may return the address information of the second EES or the identification information of the second EES to the first ECS. In some embodiments, the first ECS sends the address information of the second EES or the identification information of the second EES to the first device.

Alternatively, in another possible implementation, the information about the second EES may be indication information that indicates whether a second EES that matches the first request information exists, and the information that indicates whether a second EES that matches the first request information exists is returned to the first ECS. In some embodiments, when the second EES that matches the first request information exists, the first ECS returns the information about the second ECS to the first device. The first device requests the information about the second EES from the second ECS. Alternatively, in some embodiments, when the second EES that matches the first request information does not exist, the first ECS returns first information to the first device. The first information may be for obtaining an endpoint of an application. For example, the first information may be information about a central cloud platform, information about a DNS server of the central cloud platform, or the like. The first information may be preconfigured by the first ECS, or may be obtained by the first ECS from the second ECS.

The following separately describes solutions in embodiments of this application by using four embodiments. In Embodiment 1 and Embodiment 2, an example in which a first device is a terminal device is used for description. In addition, a difference between Embodiment 1 and Embodiment 2 is as following. In Embodiment 1, after a second EES that matches first request information exists, a second ECS returns address information of the second EES that matches the first request information or identification information of the second EES to a first ECS. In Embodiment 2, a second ECS returns, to a first ECS, indication information that indicates whether a second EES that matches first request information exists. If the second EES that matches the first request information exists, the first ECS returns information about the second ECS to the terminal device. The terminal device requests information about the second EES from the second ECS based on the information about the second ECS, to avoid leakage of a topology structure of the EES. In Embodiment 3 and Embodiment 4, an example in which a first device is a first EES is used. A difference between Embodiment 3 and Embodiment 4 is similar to that between Embodiment 1 and Embodiment 2. The differences are not described one by one.

Embodiment 1

In this embodiment of this application, a first ECS may receive a PLMN identifier of a second network from a terminal device. The second network may be a PLMN. The first ECS may determine information about a second ECS based on the PLMN identifier of the second network. Then, the first ECS sends first request information to the second ECS. After receiving the first request information, the second ECS may determine whether a second EES that matches the first request information exists. If the second EES that matches the first request information exists, the second ECS sends address information of the second EES or identification information of the second EES to the first ECS, and then the first ECS sends the address information of the second EES or the identification information of the second EES to the terminal device. If the second EES that matches the first request information does not exist, the second ECS may send first information to the first ECS. The first information may be for obtaining an endpoint of an application. For example, the first information may be information about a central cloud platform or information about a DNS server of the central cloud platform. Alternatively, the second ECS may not return any information or the like. This is not limited. The first ECS sends the first information to the terminal device. When the second ECS returns the first information, the first information may be obtained from the second ECS. When the second ECS does not return the first information, the first information may be locally matched by the first ECS. This is not limited.

Figure 4:
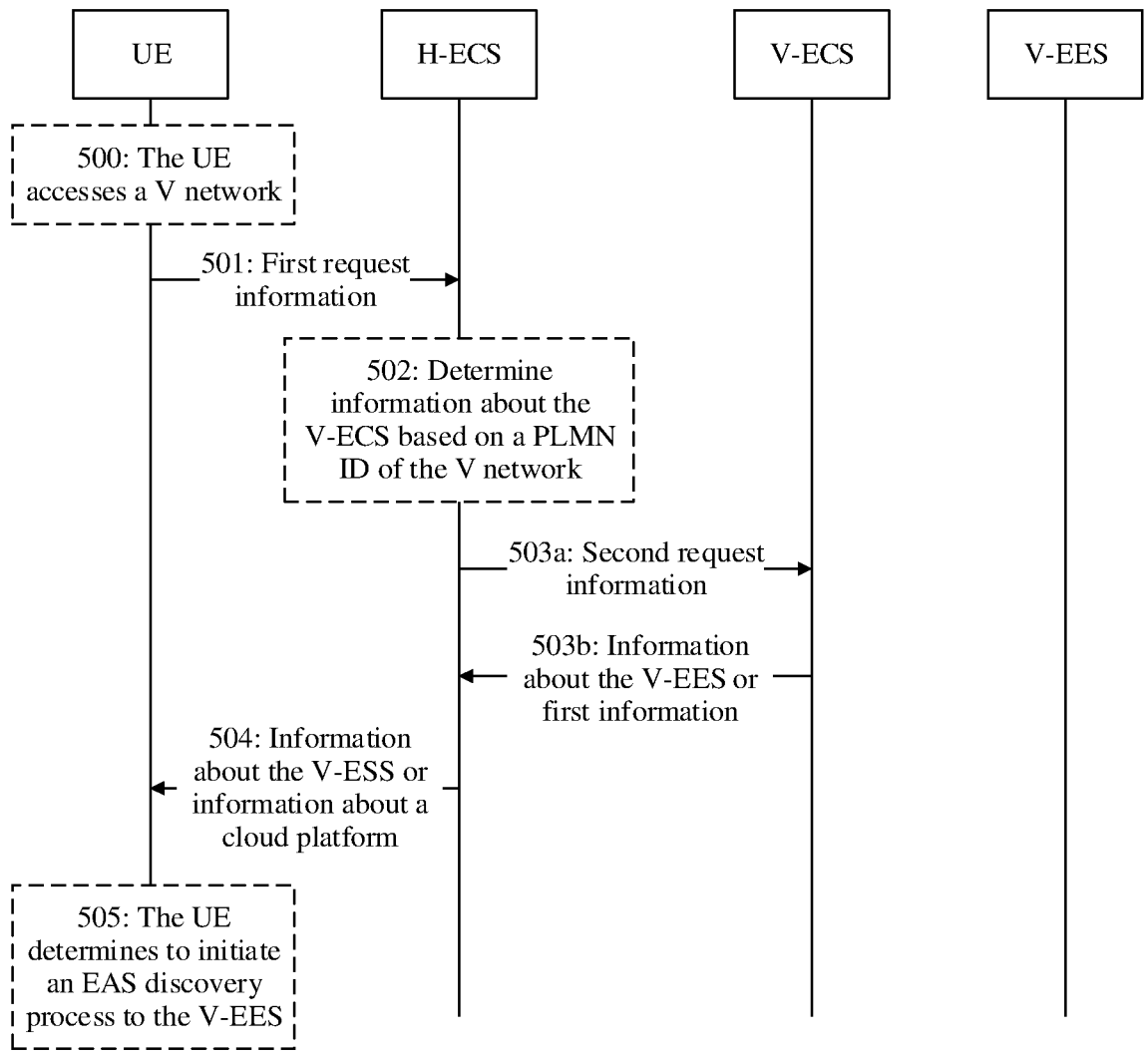
FIG. 4 is a flowchart of a communication method according to Embodiment 1 of this application.

As shown in FIG. 4, a specific process of Embodiment 1 is provided. In the process, an example in which a terminal device is UE, a first network is a home (home) network (an H network for short), a second network is a visited (visited) network (a V network for short), a first ECS and a first EAS are respectively an H-ECS and an H-EAS, and a second ECS, a second EES, and a second EAS are respectively a V-ECS, a V-EES, and a V-EAS is used for description. The process includes but is not limited to the following.

In some embodiments, in step 500, the UE accesses the V network.

In step 501, the UE sends first request information to the H-ECS, where the first request information is for requesting information about an EES. In some embodiments, the first request information may be sent by using a provision request (provision request) message.

In some embodiments, the first request information may include at least one of the following: a PLMN ID of the V network, a location of the UE in the V network, and application information of the UE.

In some embodiments, in step 502, the H-ECS determines information about the V-ECS based on the PLMN ID of the V network. The information about the V-ECS may be preconfigured in the H-ECS, or may be derived by the H-ECS based on the PLMN ID. For example, the information about the V-ECS may be address information of the V-ECS or identification information of the V-ECS.

For example, a mapping table between a PLMN ID and ECS information may be configured in the H-ECS, and the H-ECS searches, based on the PLMN ID of the V network, the mapping table for ECS information corresponding to the PLMN of the V network, that is, the information about the V-ECS. Alternatively, the H-ECS may derive the information about the V-ECS based on the PLMN ID. For example, according to a derivation formula, information about an ECS may be obtained by entering a PLMN ID.

In step 503a, the H-ECS sends second request information to the V-ECS, to request information about the V-EES corresponding to the second network. In some embodiments, the second request information may be sent by using a message, for example, a provision request (provision request), an EES request (EES request), or an EES availability request (EES availability request). The second request information may include one or more of application information, location information, and the like.

In a possible implementation, if the H-ECS receives request information of one or more UEs at a same moment or in a same time window, that is, the first request information, the H-ECS may aggregate application information in request information of a plurality of UEs and send the application information to the V-ECS, and aggregate UE location information in the request information of the plurality of UEs and send the location information to the V-ECS. Therefore, the application information in the second request information may include application information of one or more UEs, and the location information in the second request information may include location information of the one or more UEs. This is not limited.

In step 503b, the V-ECS sends the information about the V-EES or first information to the H-ECS. For example, the information about the V-EES or the first information may be sent by using a first response message. The first information may be information about a central cloud platform or information about a cloud platform DNS service.

In some embodiments, the first response message may be a message, for example, a provision response (provision response), an EES response (EES response), or an EES availability response (EES availability response). This is not limited.

For example, for the information about the V-EES, refer to the descriptions of the information about the second EES. The information about the V-EES may include address information of the V-EES or identification information of the V-EES, or the information about the V-EES may be indication information that indicates whether a V-EES that matches the first request information exists. The information about the cloud platform or the information about the DNS server of the cloud platform may be used by the UE to obtain endpoint (endpoint) information of an application to be accessed by the UE, for example, an IP address of an application server deployed on a cloud is provided. The DNS server of the cloud platform may be considered as a centralized DNS server or the like.

The V-ECS may determine, based on the second request information in the foregoing step 503a, whether a V-EES that matches the second request information exists. If the V-EES that matches the second request information exists, the first response information may include the information about the V-EES that matches the second request information. In some embodiments, the information about the V-EES may be an EES configuration profile or a tailored EES configuration profile, and may include the address information of the V-EES or the identification information of the V-EES, for example, an address of an endpoint, information about an application supported by the V-EES, for example, an application identifier, and a data network name corresponding to the V-EES, for example, a DNN. Further, if the V-EES is associated with a specific slice, the information about the V-EES may further include slice information corresponding to the V-EES, and the like. In some embodiments, the first response information may further include a security credential for accessing the V-EES.

Alternatively, if the V-EES that matches the second request information does not exist, the first response information may carry indication information that indicates that the V-EES that matches the second request information does not exist, or the like. Alternatively, the first response information may include the first information. The first information may be information about a cloud platform or information about a DNS server of the cloud platform.

For a manner in which the V-ECS determines the information about the V-EES based on the second request information, refer to the foregoing descriptions in which the second ECS determines the information about the second EES based on the first request information. Details are not described herein again.

In step 504, the H-ECS returns the information about the V-EES, the first information, or the like to the UE, where the information about the V-EES may be the address information of the V-EES or the identification information of the V-EES. In some embodiments, the information about the V-EES or the first information may be sent by using second response information. The second response information may be a provision response (provision response) or the like.

In a possible implementation, if the V-EES that matches the second request information exists, the second response information may carry the information about the V-EES, and the information about the V-EES includes at least the address information of the V-EES or the identification information of the V-EES. For specific content included in the information about the V-EES, refer to the foregoing descriptions. Further, the second response message may further carry the security credential for accessing the V-EES. Alternatively, if the V-EES that matches the second request information does not exist, the second response information may carry the indication information that indicates that the V-EES that matches the second request information does not exist, or carry the information about the cloud platform or the information about the DNS server of the cloud platform. The information about the cloud platform or the information about the DNS server of the cloud platform may be obtained from the V-ECS, or may be preconfigured in the H-ECS. This is not limited.

In some embodiments, if the UE receives the information about the V-EES returned by the H-ECS, step 505 is performed. An EEC initiates an EAS discovery request process to the V-EES, to obtain information about an EAS of the application.

In some embodiments, in step 505, the UE may send an EAS discovery request to the V-EES. The EAS discovery request carries the security credential for accessing the V-EES. The V-EES may perform authentication and authorization on the UE based on the security credential. After the authentication and the authorization succeed, the V-EES returns an EAS discovery response to the UE. The EAS discovery response carries information about an application instance that is on the V network and that is registered with the V-EES, that is, information about an EAS registered with the V-EES.

In this embodiment of this application, after registering with the visited network, the UE is still connected to the home network to obtain the information about the EES of the visited network, so that the UE can obtain the EES of the visited network only by establishing a connection to the ECS in the home network. This simplifies logic of discovering signaling of the EES of the visited network by the UE in a roaming scenario.

Embodiment 2

In this embodiment of this application, a first ECS may receive a PLMN identifier of a second network from a terminal device. The first ECS may determine information about a second ECS based on the PLMN identifier of the second network. Then, the first ECS sends first request information to the second ECS. After receiving the first request information, the second ECS may determine whether a second EES that matches the first request information exists. If the second EES that matches the first request information exists, the second ECS sends indication information that indicates that the second EES that matches the first request information exists to the first ECS. Otherwise, the second ECS sends indication information that indicates that the second EES that matches the first request information does not exist to the first ECS. After receiving the indication information that indicates that the second EES that matches the first request information exists, the first ECS may send the information about the second ECS to the terminal device. Then, the terminal device may request information about the second EES from the second ECS based on the information about the second ECS.

Figure 5:
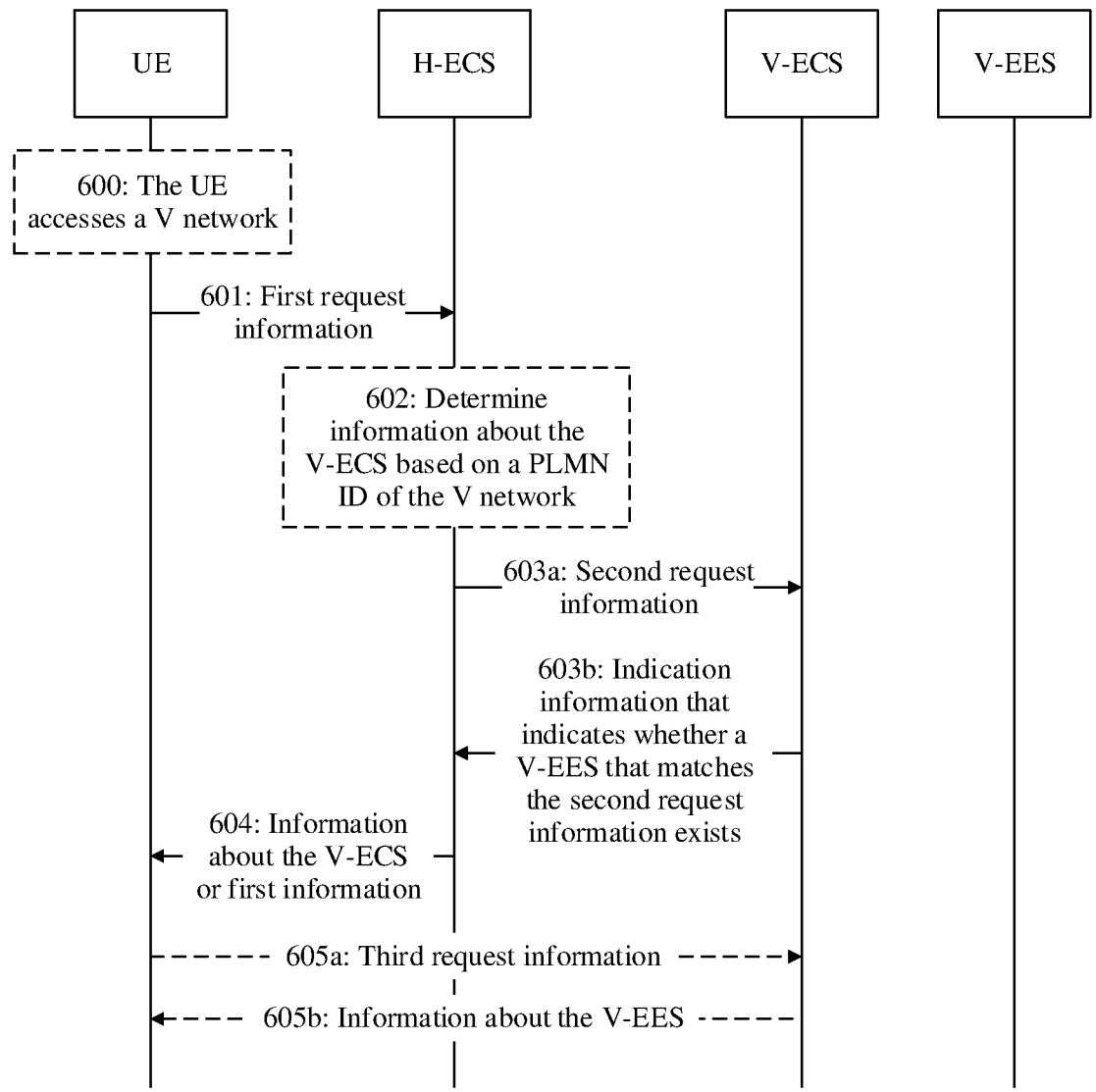
FIG. 5 is a flowchart of a communication method according to Embodiment 2 of this application.

As shown in FIG. 5, a process of Embodiment 2 is provided. In the process, an example in which a terminal device is UE, a first network is a home (home) network (an H network for short), a second network is a visited (visited) network (a V network for short), a first ECS and a first EAS are respectively an H-ECS and an H-EAS, and a second ECS, a second EES, and a second EAS are respectively a V-ECS, a V-EES, and a V-EAS is used for description. The process includes but is not limited to the following.

In some embodiments, in step 600, the UE accesses the V network.

In step 601, the UE sends first request information to the H-ECS, where the first request information is for requesting information about an EES. The first request information may carry one or more of a PLMN ID of the V network, a location of the UE in the V network, application information of the UE, and the like. In some embodiments, the first request information may be sent by using a message, for example, a provision request (provision request).

In some embodiments, in step 602, the H-ECS determines information about the V-ECS based on the PLMN identifier of the V network. For example, the information about the V-ECS may be address information of the V-ECS or identification information of the V-ECS. For a specific manner of determining the V-ECS, refer to the descriptions in step 502. Details are not described herein again.

In step 603a, the H-ECS sends second request information to the V-ECS, where the second request information is for requesting the V-EES that matches the second request information, or, in other words, the second request information is for querying the V-ECS whether a V-EES that matches the second request information exists. The second request information may include application information, location information, and the like. In some embodiments, the second request information may be sent by using a message, for example, a provision request (provision request), an EES request (EES request), or an EES availability request (EES availability request).

For steps 600 to 603a, refer to the descriptions of steps 500 to 503a in FIG. 4. Details are not described herein again.

In step 603b, the V-ECS sends, to the H-ECS based on the second request information, indication information that indicates whether a V-EES that matches the second request information exists. For a manner of determining whether a V-EES that matches the second request information exists by the V-ECS, refer to the descriptions in step 503b. In some embodiments, the indication information that indicates whether a V-EES that matches the second request information exists may be sent by using first response information. The first response information may be a provision response (provision response), an EES response (EES response), an EES availability response (EES availability response), or the like.

In a possible implementation, if the V-EES that matches the second request information exists, the first response information may carry indication information that indicates that the V-EES that matches the second request information exists. If the V-EES that matches the second request information does not exist, the first response information may include indication information that indicates that the V-EES that matches the second request information does not exist, or information about a cloud platform, information about a DNS server of the cloud platform, or the like is returned. In some embodiments, a binary bit 1 may indicate the indication information that indicates that the V-EES that matches the second request information exists, and a binary bit 0 may indicate the indication information that indicates that the V-EES that matches the second request information does not exist.

In step 604, the H-ECS returns the information about the V-ECS or first information to the UE. The information about the V-ECS may be the address information of the V-ECS or the identification information of the V-ECS. The first information may be information about a central cloud platform or information about a DNS server of the central cloud platform. In some embodiments, information about the V-EES or the first information may be sent by using second response information. In some embodiments, the second response information may be a provision response (provision response) message.

In a possible implementation, if the first response information includes the indication information that indicates that the V-EES that matches the second request information exists, the second response information may include the address information of the V-ECS. In some embodiments, the second response information may further include a security credential for accessing the V-ECS.

In another possible implementation, if the first response information includes the indication information that indicates that the V-EES that matches the second request information does not exist, or the first response information includes the information about the central cloud platform, the information about the DNS server of the cloud platform, or the like, the second response information may include indication information (for example, a failure indication) that indicates that there is no EES that matches the request, or include the information about the cloud platform, the information about the DNS server of the cloud platform, or the like. The information about the cloud platform or the information about the DNS server of the cloud platform may be carried in the first response information, that is, returned by the V-ECS, or may be locally configured by the H-ECS, or the like. This is not limited.

In some embodiments, if the second response information carries the address information of the V-ECS, the UE may connect to the V-ECS and obtain the information of the V-EES from the V-ECS, to perform the following steps 605a and 605b. If the second response information carries the information about the central cloud platform or the DNS server of the cloud platform, the UE may obtain information about a server of a corresponding application from the central cloud platform or the DNS server of the cloud platform.

In some embodiments, in step 605a, the UE sends third request information to the V-ECS, to obtain the information about the V-EES corresponding to the V network. The third request information may include the application information of the UE, the location information of the UE in the V network, and the like. In some embodiments, the third request information may be sent by using a message, for example, a provision request (provision request). The third request information may further carry the security credential for accessing the V-ECS.

In some embodiments, in step 605b, the V-ECS performs authentication and authorization on the UE based on the security credential. After the authentication and the authorization succeed, the V-ECS searches, based on the location information and/or the application information of the UE, for a V-EES that matches the third request information, and after the search succeeds, returns the information about the V-EES corresponding to the V network to an EEC, that is, the V-ECS returns the information about the V-EES to the UE. The information about the V-EES may be sent by using third response information. The third response information may be a provision response (provision response), or the like.

Mutual reference may be made between the descriptions of Embodiment 1 and Embodiment 2. In Embodiment 2, the UE obtains the address information of the V-ECS from the H-ECS, and directly obtains the information about the V-EES from the V-ECS. According to this solution, the UE is enabled to discover the V-EES, and topology information of an EES of the V network is protected.

Embodiment 3

In this embodiment of this application, a first ECS may receive a PLMN identifier of a second network from a first EES. The first ECS may determine information about a second ECS based on the PLMN identifier of the second network. Then, the first ECS sends first request information to the second ECS. After receiving the first request information, the second ECS may determine whether a second EES that matches the first request information exists. If the second EES that matches the first request information exists, the second ECS sends address information of the second EES or identification information of the second EES to the first ECS, and then the first ECS sends the address information of the second EES or the identification information of the second EES to the first EES. If the second EES that matches the first request information does not exist, the second ECS may send first information to the first ECS. The first information may be for obtaining an endpoint of an application. Then, the first ECS sends the first information to the first EES. The first information may be obtained from the second ECS, or may be locally matched by the first ECS, or the like. This is not limited.

Figure 6:
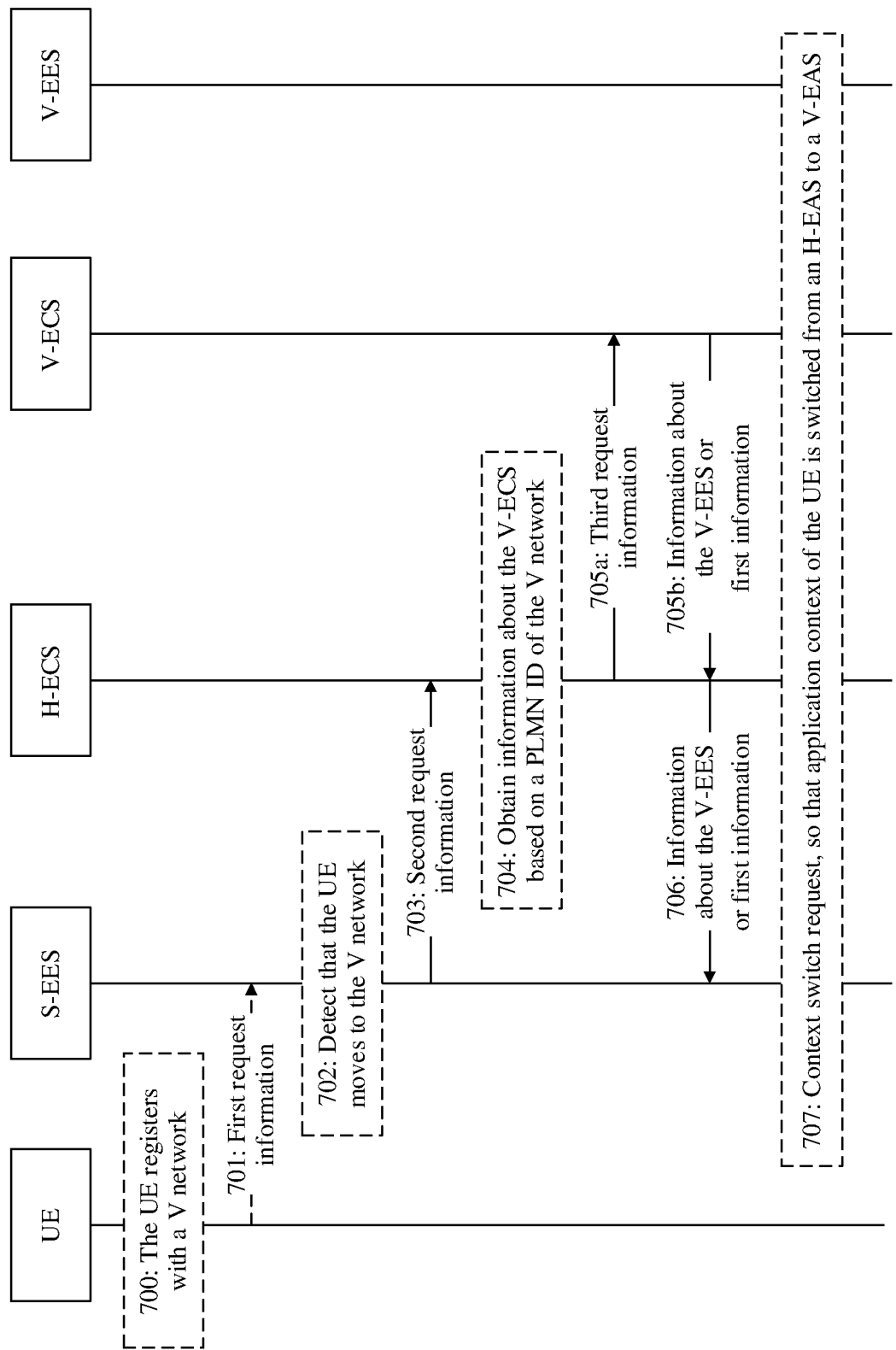
FIG. 6 is a flowchart of a communication method according to Embodiment 3 of this application.

As shown in FIG. 6, a specific process of Embodiment 3 is provided. In the process, an example in which a terminal device is UE, a first network is a home (home) network (an H network for short), a second network is a visited (visited) network (a V network for short), a first EES, a first ECS, and a first EAS are respectively an S-EES, an H-ECS, and an H-EAS, and a second EES, a second ECS, and a second EAS are respectively a V-EES, a V-ECS, and a V-EAS is used for description. The process includes but is not limited to the following.

In some embodiments, in step 700, the UE registers with the V network.

In some embodiments, in step 701, the UE is connected to the S-EES corresponding to the home network, and sends first request information to the S-EES. The first request information may be sent by using a message, for example, a connection request. The first request information includes a PLMN ID of the V network, or a location of the UE in the V network, for example, a cell ID of the UE in the V network. In some embodiments, the first request information may further include an IP address of the UE and the like. The S-EES is an EES corresponding to an EAS connected to an application client that currently serves the terminal device. Different EESs may provide services for different EASs connected to different application clients of the terminal device.

In some embodiments, in step 702, the S-EES detects that the UE moves to the V network. For example, the S-EES receives a user plane path management event (UP path management event) notification. The notification includes a target DNAI and a new IP address of the UE. The S-EES may determine, based on a change of a PLMN ID of the UE, a target DNAI indication corresponding to the V network, or a change of the IP address of the UE, that the current S-EES is not an optimal EES, and the S-EES triggers application migration.

In step 703, the S-EES is connected to an ECS corresponding to a home network corresponding to the S-EES, that is, the H-ECS, and sends second request information to the H-ECS, where the second request information is for requesting information about an EES. In some embodiments, the second request information may be sent by using a provision request (provision request) message. The second request information may carry one or more of application information of the UE, the location of the UE in the V network, the PLMN ID of the V network, the IP address of the UE, and the like.

In some embodiments, in step 704, the H-ECS obtains information about the V-ECS based on the PLMN ID of the V network. For example, the information about the V-ECS may be address information of the V-ECS, identification information of the V-ECS, or the like. The address may be preconfigured in the H-ECS, or may be derived by the H-ECS based on the PLMN ID. For a specific manner of determining the V-ECS, refer to the descriptions in step 502. Details are not described herein again. In step 705a, the H-ECS sends third request information to the V-ECS, to request the V-EES corresponding to the second network. The third request information may include location information, application information, or the like. The third request information may be sent by using a message, for example, a provision request (provision request), an EES request (EES request), or an EES availability request (EES availability request). This is not limited.

In step 705b, the V-ECS sends information about the V-EES or first information to the H-ECS. The information about the V-EES may be identification information of the V-EES, address information of the V-EES, or the like. The first information may be information about a central cloud platform, information about a DNS server of the central cloud platform, or the like. The information about the V-EES or the first information may be sent by using first response information. In some embodiments, the first response information may be a provision response (provision response), an EES response (EES response), an EES availability response (EES availability response), or the like. This is not limited.

The V-ECS may determine, based on the third request information in the foregoing step 705a, whether a V-EES that matches the third request information exists. If the V-EES that matches the third request information exists, the first response information may include the information about the V-EES that matches the third request information. In some embodiments, the information about the V-EES may be an EES configuration profile or a tailored EES configuration profile, and may include the address information of the V-EES, for example, an address of an endpoint, information about an application supported by the V-EES, for example, an application identifier, and a data network name corresponding to the V-EES, for example, a DNN. Further, if the V-EES is a V-EES of a slice, the information about the V-EES may further include slice information corresponding to the V-EES, and the like. In some embodiments, the first response information may further include a security credential for accessing the V-EES.

Alternatively, if the V-EES that matches the third request information does not exist, the first response information may carry indication information that indicates that the V-EES matches the third request information does not exist, or the like. Alternatively, the first response may include the information about the cloud platform or the information about the DNS server of the cloud platform.

In step 706, the H-ECS sends the information about the V-EES or the first information to the S-EES. The information about the V-EES or the first information may be sent by using second response information. In some embodiments, the second response information may be a message, for example, a provision response (provision response).

In a possible implementation, if the V-EES that matches the third request information exists, the second response information may carry the information about the V-EES. Alternatively, if the V-EES that matches the third request information does not exist, the second response information may carry indication information that indicates that the V-EES that matches the third request information does not exist, or carry the information about the cloud platform or the information about the DNS server of the cloud platform. The information about the cloud platform or the information about the DNS server of the cloud platform may be obtained from the V-ECS, or may be preconfigured in the H-ECS. This is not limited.

In some embodiments, if the second response information includes the information about the V-EES that matches the third request information, the following step 707 is performed.

In some embodiments, in step 707, the S-EES sends an application context migration request to the V-EES, so that application context of the UE is migrated from the H-EAS to the V-EAS.

In some embodiments, the context migration request may carry the application information of the UE and the location information of the UE. In some embodiments, a security credential may be further included. The V-EES may process context request information of the S-EES based on the security credential and the request of the S-EES after authentication and authorization succeed, to implement IP address exchange between the H-EAS and the V-EAS, complete application context migration of the UE, and migrate the application context of the UE from the H-EAS to the V-EAS.

In this embodiment of this application, after registering with the V network, the UE may still be connected to the S-EES and the H-EAS. The S-EES determines, based on the change of the PLMN ID of the UE or the change of the IP address of the UE, that the UE has moved to the V network. The current H-EAS or S-EES is no longer the most proper EAS or EES. The H-ECS, as a proxy of an EES, interacts with the V-ECS to obtain the information about the V-EES, to reduce interfaces for external interaction of the V network.

The foregoing process gives descriptions mainly about that when UE moves and registers with a V network, the UE can still be connected to an S-EES of a home network, and report a PLMN ID of the UE to the S-EES. Certainly, the S-EES may further detect, according to another method, that the UE moves and registers with the V network, to trigger application context migration, find a V-EES in the V network, and implement application context migration of the UE. This ensures service experience and service continuity of the UE.

Embodiment 4

In this embodiment of this application, a first ECS may receive a PLMN identifier of a second network from a first EES. The first ECS may determine information about a second ECS based on the PLMN identifier of the second network. Then, the first ECS sends first request information to the second ECS. After receiving the first request information, the second ECS may determine whether a second EES that matches the first request information exists. If the second EES that matches the first request information exists, the second ECS sends indication information that indicates that the second EES that matches the first request information exists to the first ECS. Otherwise, the second ECS sends indication information that indicates that the second EES that matches the first request information does not exist to the first ECS. After receiving the indication information that indicates that the second EES that matches the first request information exists, the first ECS may send the information about the second ECS to the first EES. Then, the first EES may request information about the second EES from the second ECS.

Figure 7:
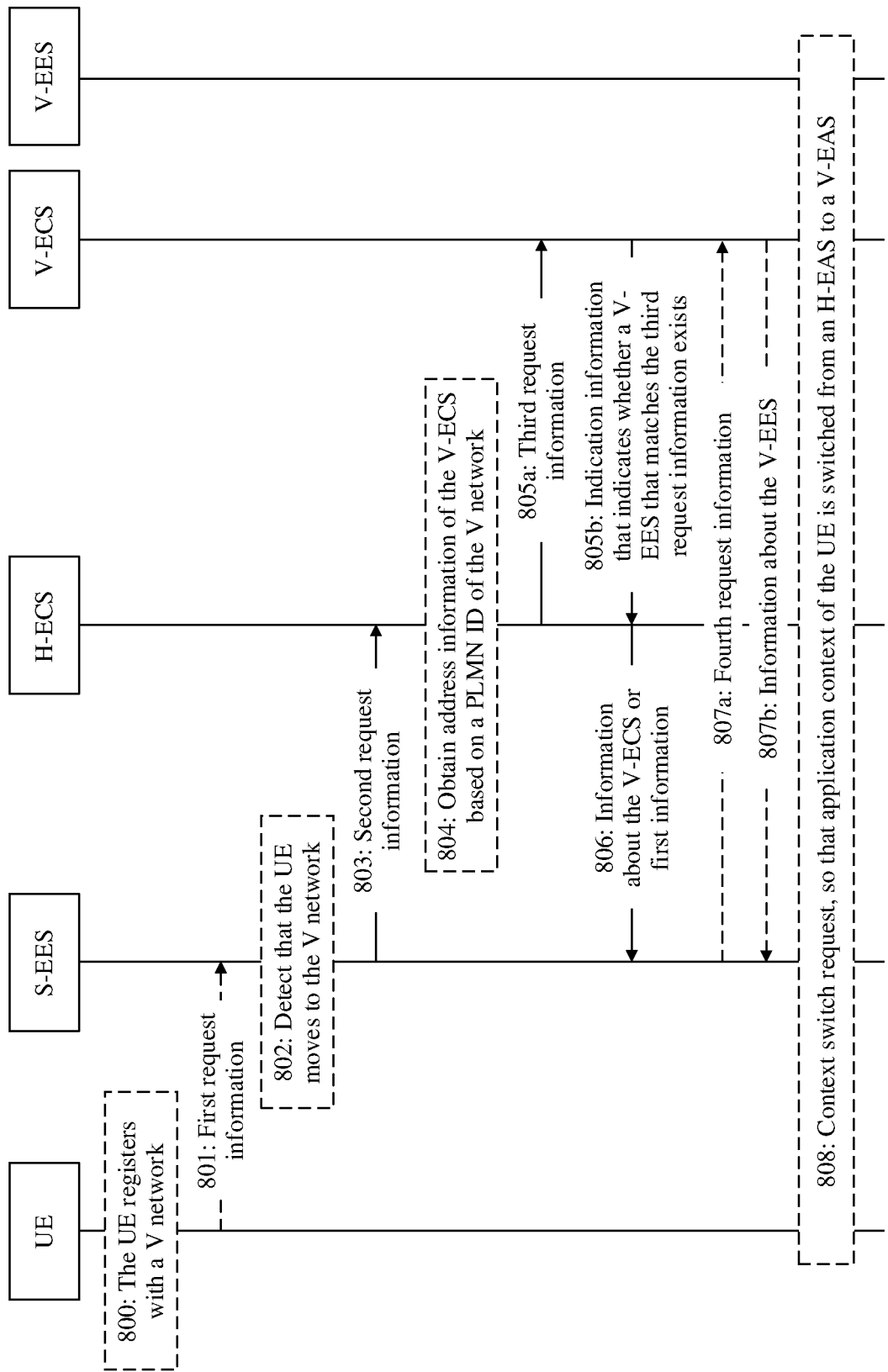
FIG. 7 is a flowchart of a communication method according to Embodiment 4 of this application.

As shown in FIG. 7, a specific process of Embodiment 4 is provided. In the process, an example in which a terminal device is UE, a first network is a home (home) network, a second network is a visited (visited) network (a V network for short), a first EES, a first ECS, and a first EAS are respectively an S-EES, an H-ECS, and an H-EAS, and a second EES, a second ECS, and a second EAS are respectively a V-EES, a V-ECS, and a V-EAS is used for description. The process includes but is not limited to the following.

In some embodiments, in step 800, the UE registers with the V network.

In some embodiments, in step 801, the UE is connected to the S-EES located in the home network, and sends first request information to the S-EES. The first request information may also be referred to as a connection request. The first request information may include one or more of a PLMN ID of the V network, location information of the UE in the V network, or the like. In some embodiments, the first request information may further include an IP address of the UE and the like.

In some embodiments, in step 802, the S-EES detects that the UE moves to the V network.

In step 803, the S-EES is connected to an ECS of a home network corresponding to the S-EES, that is, the H-ECS, and sends second request information to the H-ECS, where the second request information is for requesting information about an EES. The second request information may carry one or more of application information of the UE, the location of the UE in the V network, the PLMN ID of the V network, the IP address of the UE, and the like. In some embodiments, the second request information may be sent by using a message, for example, a provision request (provision request).

In some embodiments, in step 804, the H-ECS obtains information about the V-ECS based on the PLMN ID of the V network. For example, the information about the V-ECS may be identification information of the V-ECS or address information of the V-ECS.

In step 805*a*, the H-ECS sends third request information to the V-ECS, to request the V-EES corresponding to the second network. The second request information may include one or more of location information, application information, and the like. The third request information may be sent by using a message, for example, a provision request (provision request), an EES request (EES request), or an EES availability request (EES availability request). This is not limited.

In step 805*b*, the V-ECS sends, to the H-ECS, indication information that indicates whether a V-EES that matches the third request information exists. The indication information that indicates whether a V-EES that matches the third request information exists may be sent by using first response information. The first response information may be a provision response (provision response), an EES response (EES response), an EES availability response (EES availability response), or the like. This is not limited.

In some embodiments, the V-ECS may determine, based on the third request information in the foregoing step 805*a*, whether a V-EES that matches the third request information exists. If the V-EES that matches the third request information exists, the first response information may carry indication information that indicates that the V-EES that matches the third request information exists. For example, the indication information may be represented by bit 1. If the V-EES that matches the third request information does not exist, the first response information may carry indication information that indicates that the V-EES that matches the third request information does not exist. For example, the indication information may be represented by bit 0. Alternatively, the first response information may carry information about a central cloud platform, information about a DNS server of the central cloud platform, or the like.

In step 806, the H-ECS sends the information about the V-ECS or first information to the S-EES. In some embodiments, the information about the V-ECS may be the address information of the V-ECS or the identification information of the V-ECS. The first information may be the information about the central cloud platform, the information about the DNS server of the central cloud platform, or the like. The address information of the V-ECS or the first information may be sent by using second response information. In some embodiments, the second response information may be a provision response (provision response) message or the like.

In a possible implementation, if the first response information carries the indication information that indicates that the V-EES that matches the third request information exists, the second response information may carry the address information of the V-ECS.

In another possible implementation, if the first response information does not carry the indication information that indicates that the V-EES that matches the third request information exists, or carries the information about the central cloud platform or the information about the DNS server of the central cloud platform, the second response information may carry the information about the central cloud platform, the information about the DNS server of the cloud platform, or the like. The information about the central cloud platform or the information about the DNS server of the cloud platform may be obtained from the V-ECS, or may be preconfigured in the H-ECS.

In some embodiments, in step 807*a*, the S-EES sends fourth request information to the V-ECS. The fourth request information may be sent by using a provision request (provision request) or the like. The fourth request information is for obtaining information about an EES corresponding to the V network. The fourth request information may carry the application information of the UE, the location information of the UE in the V network, a security credential for accessing the V-ECS, and the like.

In some embodiments, in step 807*b*, the V-ECS sends the information about the V-EES to the S-EES. The information about the V-EES may be sent by using fourth response information. The fourth response information may be a provision response (provision response) message. The fourth response information includes the information about the V-EES. In some embodiments, the fourth response information may further include a security credential for accessing the V-EES.

In some embodiments, in step 808, the S-EES initiates application context migration, to migrate application context of the UE from the H-EAS to the V-EAS.

In the foregoing embodiment, after registering with the V network, the UE may still be connected to the S-EES and the H-EAS of the home network. The H-WWS may determine, based on a change of a PLMN ID of the UE or a change of the IP address of the UE, that the UE has moved to the V network. The H-EAS or the S-EES of the current home network is no longer the most proper EAS or EES. The H-ECS interacts with the V-ECS. After determining that the V-ECS has a V-EES that meets application and location information, the S-EES requests the V-ECS for the V-EES that meets the application and location information, so that validity of the request is ensured and continuity of a user service is implemented.

The foregoing describes in detail the methods provided in embodiments of this application with reference to FIG. 1 to FIG. 7. The following describes in detail apparatuses provided in embodiments of this application with reference to FIG. 8 and FIG. 9. It should be understood that descriptions of the apparatus embodiments correspond to descriptions of the method embodiments. Therefore, for content that is not described in detail, refer to the descriptions in the foregoing method embodiments.

Figure 8:
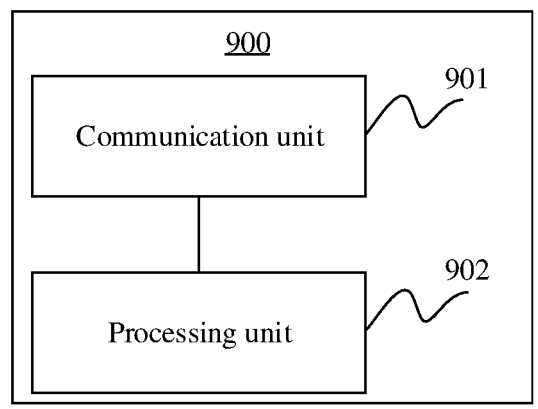
FIG. 8 is a schematic diagram of a structure of an apparatus according to at least an embodiment of this application.

FIG. 8 is a schematic block diagram of an apparatus 900 according to an embodiment of this application. The apparatus 900 is configured to implement functions of the first ECS, the first device, or the second ECS in the foregoing methods. For example, the apparatus may be a software unit or a chip system. The chip system may include a chip, or may include a chip and another discrete component. The apparatus includes a communication unit 901, and may further include a processing unit 902. The communication unit 901 may communicate with the outside. The processing unit 902 is configured to perform processing. The communication unit 901 may also be referred to as a communication interface, a transceiver unit, an input/output interface, or the like.

In an example, the apparatus 900 may implement the steps performed by the first ECS in the foregoing method embodiments. The apparatus 900 may be the first ECS, or a chip or circuit disposed in the first ECS. The communication unit 901 performs a sending/receiving operation of the first ECS in the foregoing method embodiments, and the processing unit 902 is configured to perform a processing-related operation of the first ECS in the foregoing method embodiments.

For example, the communication unit 901 is configured to receive a public land mobile network PLMN identifier of a second network from a first device, where the first device includes a terminal device or a first EES. The processing unit 902 is configured to send first request information to a second ECS based on the PLMN identifier, where the first request information is for requesting information about a second EES corresponding to the second network. The communication unit 901 is further configured to receive the information about the second EES from the second ECS.

A home network of the terminal device is a first network. The first ECS and the first EES correspond to the first network. The second network is a serving network of the terminal device. The second ECS and the second EES correspond to the second network.

In some embodiments, the communication unit 901 is further configured to receive, from the first device, one or both of location information of the terminal device in the second network and application information of the terminal device.

In some embodiments, the first request information includes one or both of the location information of the terminal device in the second network and the application information of the terminal device.

In some embodiments, the information about the second EES includes address information of the second EES that matches the first request information or identification information of the second EES, and the communication unit 901 is further configured to send the information about the second EES to the first device.

In some embodiments, the communication unit 901 is further configured to: receive, from the second ECS, a security credential for accessing the second EES, and send the security credential of the second EES to the first device.

In some embodiments, the information about the second EES indicates that the second EES that matches the first request information exists, and the communication unit 901 is further configured to send information about the second ECS to the first device.

In some embodiments, the communication unit 901 is further configured to: receive, from the second ECS, a security credential for accessing the second ECS, and send the security credential of the second ECS to the first device.

In some embodiments, the information about the second EES indicates that the second EES that matches the first request information does not exist, and the communication unit 901 is further configured to send first information to the first device, where the first information is obtained from the second ECS or locally configured, and the first information is for obtaining an endpoint of an application.

In an example, the apparatus 900 may implement the steps performed by the first device in the foregoing method embodiments. The apparatus 900 may be the first device, or a chip or circuit disposed in the first device. The communication unit 901 performs a sending/receiving operation of the first device in the foregoing method embodiments, and the processing unit 902 is configured to perform a processing-related operation of the first device in the foregoing method embodiments.

For example, the communication unit 901 is configured to send a public land mobile network PLMN identifier of a second network to a first ECS, where the PLMN identifier is for confirming information about a second ECS. The communication unit 901 is further configured to receive information about a second EES. The first device includes a terminal device or a first EES. A home network of the terminal device is a first network. The first EES and the first ECS correspond to the first network. The second network is a serving network of the terminal device. The second ECS and the second EES correspond to the second network.

In some embodiments, the communication unit 901 is further configured to send one or both of the following information to the first ECS: location information of the terminal device in the second network and application information of the terminal device.

In some embodiments, the information about the second EES includes address information of the second EES that matches first request information or identification information of the second EES.

The receiving the information about the second EES includes: receiving the information about the second EES from the first ECS.

In some embodiments, the communication unit 901 is further configured to receive, from the first ECS, a security credential for accessing the second EES.

In some embodiments, the information about the second EES indicates that the second EES that matches the first request information exists, and the receiving the information about the second EES includes: receiving the information about the second ECS from the first ECS; sending second request information to the second ECS, where the second request information is for requesting the information about the second EES; and receiving the information about the second EES from the second ECS, where the information about the second EES includes address information of the second EES that matches the first request information or identification information of the second EES.

In some embodiments, the communication unit 901 is further configured to receive, from the first ECS, a security credential for accessing the second ECS.

In some embodiments, the information about the second EES indicates that the second EES that matches the first request information does not exist, and the communication unit 901 is further configured to receive first information from the first ECS, where the first information is for obtaining an endpoint of an application.

In some embodiments, the first device is the first EES, and the communication unit 901 is further configured to receive third request information from the terminal device, where the third request information includes the PLMN identifier of the second network.

In an example, the apparatus 900 may implement the steps performed by the second ECS in the foregoing method embodiments. The apparatus 900 may be the second ECS, or a chip or circuit disposed in the second ECS. The communication unit 901 performs a sending/receiving operation of the second ECS in the foregoing method embodiments, and the processing unit 902 is configured to perform a processing-related operation of the second ECS in the foregoing method embodiments.

For example, the communication unit 901 is configured to receive first request information from a first ECS, where the first request information is for requesting information about a second edge enabler server EES corresponding to a second network. The communication unit 901 is further configured to send the information about the second EES to the first ECS. The second ECS and the second EES correspond to the second network. The first ECS corresponds to a first network. The first network is a home network of a terminal device. The second network is a serving network of the terminal device.

In some embodiments, the first request information includes one or both of location information of the terminal device in the second network and application information of the terminal device.

In some embodiments, the information about the second EES includes address information of the second EES that matches the first request information or identification information of the second EES.

In some embodiments, the communication unit 901 is further configured to send, to the first ECS, a security credential for accessing the second EES.

In some embodiments, the information about the second EES indicates whether a second EES that matches the first request information exists.

In some embodiments, the communication unit 901 is further configured to send, to the first ECS, a security credential for accessing the second ECS.

In some embodiments, the information about the second EES indicates that the second EES that matches the first request information does not exist, and the communication unit 901 is further configured to send first information to the first ECS, where the first information is for obtaining an endpoint of an application.

It should be understood that division into the units in the foregoing apparatus is merely logical function division.

During actual implementation, all or some of the units may be integrated into one physical entity or may be physically separated. In addition, all the units in the apparatus may be implemented in a form of software invoked by a processing element, or may be implemented in a form of hardware. Alternatively, some units may be implemented in a form of software invoked by a processing element, and some units may be implemented in a form of hardware. For example, each unit may be a separate and independent processing element, or may be integrated into a chip of the apparatus for implementation. Herein, the unit may alternatively be stored in a memory in a form of a program, and is invoked by a processing element of the apparatus to perform a function of the unit. Herein, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, any one of the foregoing units in the apparatus may be one or more integrated circuits configured to implement the foregoing methods, for example, one or more application-specific integrated circuits (ASICs), one or more microprocessors (DSPs), one or more field programmable gate arrays (FPGAs), or a combination of at least two of the integrated circuit forms. For another example, when the unit in the apparatus may be implemented by scheduling a program by a processing element, the processing element may be a general-purpose processor, for example, a central processing unit (CPU) or another processor that can invoke the program. For still another example, the units may be integrated and implemented in a form of a system-on-a-chip (SOC).

The foregoing unit for receiving is an interface circuit of the apparatus, and is configured to receive a signal from another apparatus. For example, when the apparatus is implemented in a chip manner, the receiving unit is an interface circuit that is used by the chip to receive a signal from another chip or apparatus. The foregoing unit for sending is an interface circuit of the apparatus, and is configured to send a signal to another apparatus. For example, when the apparatus is implemented in a chip manner, the sending unit is an interface circuit that is used by the chip to send a signal to another chip or apparatus.

Figure 9:
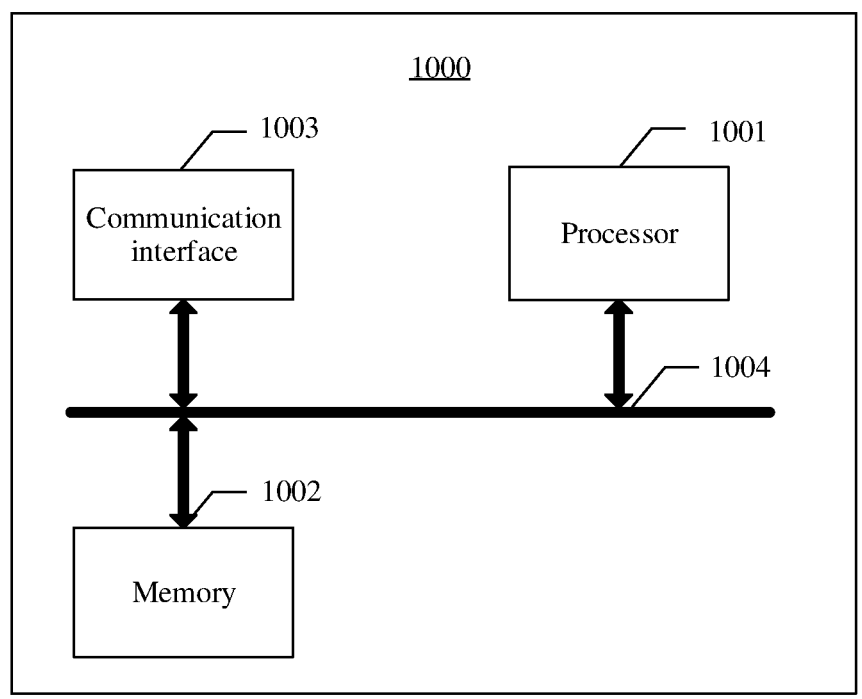
FIG. 9 is a schematic diagram of another structure of an apparatus according to at least an embodiment of this application.

FIG. 9 is a schematic block diagram of an apparatus 1000 according to an embodiment of this application. The apparatus 1000 shown in FIG. 9 may be an implementation of a hardware circuit of the apparatus shown in FIG. 8. The apparatus is applicable to the processes in the foregoing method embodiments, and performs functions of the first ECS, the first device, or the second ECS in the foregoing method embodiments. For ease of description, FIG. 9 shows only main components of the communication apparatus.

The communication apparatus 1000 shown in FIG. 9 includes at least one processor 1001. The communication apparatus 1000 may further include at least one memory 1002, configured to store program instructions and/or data. The memory 1002 is coupled to the processor 1001. The coupling in this embodiment of this application may be indirect coupling or a communication connection between apparatuses, units, or modules in an electrical form, a mechanical form, or another form, and is used for information exchange between the apparatuses, the units, or the modules. The processor 1001 may cooperate with the memory 1002, the processor 1001 may execute program instructions stored in the memory 1002, and at least one of the at least one memory 1002 may be included in the processor 1001.

The apparatus 1000 may further include a communication interface 1003, configured to communicate with another device through a transmission medium, so that the communication apparatus 1000 can communicate with the another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

It should be understood that a connection medium between the processor 1001, the memory 1002, and the communication interface 1003 is not limited in this embodiment of this application. In this embodiment of this application, the memory 1002, the processor 1001, and the communication interface 1003 are connected through a communication bus 1004 in FIG. 9. The bus is represented by using a thick line in FIG. 9. A connection manner between other components is merely an example for description, and is not limited. The bus may include an address bus, a data bus, a control bus, and the like. For ease of representation, only one thick line is used to represent the bus in FIG. 9, but this does not mean that there is only one bus or only one type of bus.

In an example, the apparatus 1000 is configured to implement the steps performed by the first ECS in the foregoing method embodiments. The communication interface 1003 is configured to perform a sending/receiving-related operation of the first ECS in the foregoing embodiments, and the processor 1001 is configured to perform a processing-related operation of the first ECS in the foregoing method embodiments.

For example, the communication interface 1003 is configured to receive a public land mobile network PLMN identifier of a second network from a first device, where the first device includes a terminal device or a first EES. The processor 1001 is configured to send first request information to a second ECS based on the PLMN identifier, where the first request information is for requesting information about a second EES corresponding to the second network. The communication interface 1003 is further configured to receive the information about the second EES from the second ECS.

A home network of the terminal device is a first network. The first ECS and the first EES correspond to the first network. The second network is a serving network of the terminal device. The second ECS and the second EES correspond to the second network.

In some embodiments, the communication interface 1003 is further configured to receive, from the first device, one or both of location information of the terminal device in the second network and application information of the terminal device.

In some embodiments, the first request information includes one or both of the location information of the terminal device in the second network and the application information of the terminal device.

In some embodiments, the information about the second EES includes address information of the second EES that matches the first request information or identification information of the second EES, and the communication interface 1003 is further configured to send the information about the second EES to the first device.

In some embodiments, the communication interface 1003 is further configured to: receive, from the second ECS, a security credential for accessing the second EES, and send the security credential of the second EES to the first device.

In some embodiments, the information about the second EES indicates that the second EES that matches the first request information exists, and the communication interface 1003 is further configured to send information about the second ECS to the first device.

In some embodiments, the communication interface 1003 is further configured to: receive, from the second ECS, a security credential for accessing the second ECS, and send the security credential of the second ECS to the first device.

In some embodiments, the information about the second EES indicates that the second EES that matches the first request information does not exist, and the communication interface 1003 is further configured to send first information to the first device, where the first information is obtained from the second ECS or locally configured, and the first information is for obtaining an endpoint of an application.

In an example, the apparatus 1000 is configured to implement the steps performed by the first device in the foregoing method embodiments. The communication interface 1003 is configured to perform a sending/receiving-related operation of the first device in the foregoing embodiments, and the processor 1001 is configured to perform a processing-related operation of the first device in the foregoing method embodiments.

For example, the communication interface 1003 is configured to send a public land mobile network PLMN identifier of a second network to a first ECS, where the PLMN identifier is for confirming information about a second ECS. The communication interface 1003 is further configured to receive information about a second EES. The first device includes a terminal device or a first EES. A home network of the terminal device is a first network. The first EES and the first ECS correspond to the first network. The second network is a serving network of the terminal device. The second ECS and the second EES correspond to the second network.

In some embodiments, the communication interface 1003 is further configured to send one or both of the following information to the first ECS: location information of the terminal device in the second network and application information of the terminal device.

In some embodiments, the information about the second EES includes address information of the second EES that matches first request information or identification information of the second EES.

The receiving the information about the second EES includes: receiving the information about the second EES from the first ECS.

In some embodiments, the communication interface 1003 is further configured to receive, from the first ECS, a security credential for accessing the second EES.

In some embodiments, the information about the second EES indicates that the second EES that matches the first request information exists, and the receiving the information about the second EES includes: receiving the information about the second ECS from the first ECS; sending second request information to the second ECS, where the second request information is for requesting the information about the second EES; and receiving the information about the second EES from the second ECS, where the information about the second EES includes address information of the second EES that matches the first request information or identification information of the second EES.

In some embodiments, the communication interface 1003 is further configured to receive, from the first ECS, a security credential for accessing the second ECS.

In some embodiments, the information about the second EES indicates that the second EES that matches the first request information does not exist, and the communication interface 1003 is further configured to receive first information from the first ECS, where the first information is for obtaining an endpoint of an application.

In some embodiments, the first device is the first EES, and the communication interface 1003 is further configured to receive third request information from the terminal device, where the third request information includes the PLMN identifier of the second network.

In an example, the apparatus 1000 is configured to implement the steps performed by the second ECS in the foregoing method embodiments. The communication interface 1003 is configured to perform a sending/receiving-related operation of the second ECS in the foregoing method embodiments, and the processor 1001 is configured to perform a processing-related operation of the second ECS in the foregoing method embodiments.

For example, the communication interface 1003 is configured to receive first request information from a first ECS, where the first request information is for requesting information about a second edge enabler server EES corresponding to a second network. The communication interface 1003 is further configured to send the information about the second EES to the first ECS. The second ECS and the second EES correspond to a second network. The first ECS corresponds to a first network. The first network is a home network of a terminal device. The second network is a serving network of the terminal device.

In some embodiments, the first request information includes one or both of location information of the terminal device in the second network and application information of the terminal device.

In some embodiments, the information about the second EES includes address information of the second EES that matches the first request information or identification information of the second EES.

In some embodiments, the communication interface 1003 is further configured to send, to the first ECS, a security credential for accessing the second EES.

In some embodiments, the information about the second EES indicates whether a second EES that matches the first request information exists.

In some embodiments, the communication interface 1003 is further configured to send, to the first ECS, a security credential for accessing the second ECS.

In some embodiments, the information about the second EES indicates that the second EES that matches the first request information does not exist, and the communication interface 1003 is further configured to send first information to the first ECS, where the first information is for obtaining an endpoint of an application.

Further, an embodiment of this application further provides an apparatus. The apparatus is configured to perform the methods in the foregoing method embodiments. A computer-readable storage medium is provided, and includes a program. When the program is run by a processor, the methods in the foregoing method embodiments are performed. A computer program product is provided. The computer program product includes computer program code. When the computer program code is run on a computer, the computer is enabled to implement the methods in the foregoing method embodiments. A chip is provided, and includes a processor. The processor is coupled to a memory. The memory is configured to store a program or instructions. When the program or the instructions is/are executed by the processor, an apparatus is enabled to perform the methods in the foregoing method embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any processor, or the like. The steps of the method disclosed with reference to embodiments of this application may be directly performed by a hardware processor, or may be performed by using a combination of hardware in the processor and a software module.

In embodiments of this application, the memory may be a non-volatile memory, for example, a hard disk drive (HDD) or a solid-state drive (SSD), or may be a volatile memory (volatile memory), for example, a random access memory (RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

All or some of the methods in embodiments of this application may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the processes or functions according to embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clearly that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:
   receiving, by a first edge configuration server (ECS), a public land mobile network (PLMN) identifier of a second network from a first device, wherein the first device comprises a terminal device or a first edge enabler server (EES);
   sending, by the first ECS, first request information to a second ECS based on the PLMN identifier, wherein the first request information is useable for requesting information of a second EES; and
   receiving, by the first ECS, the information of the second EES from the second ECS, wherein
   a first network is a home network of the terminal device, the first ECS and the first EES correspond to the first network, the second network is a serving network of the terminal device, and the second ECS and the second EES correspond to the second network.

2. The method according to claim 1, further comprising:
   receiving, by the first ECS from the first device, at least one of location information of the terminal device in the second network or application information of the terminal device.

3. The method according to claim 1, wherein the first request information comprises at least one of location information of the terminal device in the second network or application information of the terminal device.

4. The method according to claim 1, wherein the information of the second EES comprises address information of the second EES that matches the first request information, and the method further comprises:
   sending, by the first ECS, the information of the second EES to the first device.

5. The method according to claim 4, further comprising:
   receiving, by the first ECS from the second ECS, a security credential useable for accessing the second EES; and
   sending, by the first ECS, the security credential to the first device.

6. The method according to claim 1, wherein the information of the second EES is useable to indicates that the second EES matches the first request information, and the method further comprises:
   sending, by the first ECS, the information of the second ECS to the first device.

7. The method according to claim 6, further comprising:
   receiving, by the first ECS from the second ECS, a security credential useable for accessing the second ECS; and
   sending, by the first ECS, the security credential to the first device.

8. The method according to claim 1, wherein the information of the second EES is useable to indicates that the second EES fails to matches the first request information, and the method further comprises:
   sending, by the first ECS, first information to the first device, wherein the first information is obtained from the second ECS or is locally configured by the first ECS, and the first information is for obtaining an endpoint of an application.

9. A communication method, comprising:
   sending, by a first device, a public land mobile network (PLMN) identifier of a second network to a first edge configuration server (ECS), wherein the PLMN identifier is useable for confirming information of a second ECS; and receiving, by the first device, information of a second edge enabler server (EES), wherein the first device comprises a terminal device or a first EES, a first network is a home network of the terminal device, the first EES and the first ECS correspond to the first network, the second network is a serving network of the terminal device, and the second ECS and the second EES correspond to the second network.

10. The method according to claim 9, further comprising:
sending, by the first device to the first ECS, at least one of location information of the terminal device in the second network or application information of the terminal device.

11. The method according to claim 9, wherein
the information of the second EES comprises address information of the second EES that matches first request information; and
the receiving, by the first device, the information of the second EES comprises:
  receiving, by the first device, the information of the second EES from the first ECS.

12. The method according to claim 11, further comprising:
receiving, by the first device from the first ECS, a security credential useable for accessing the second EES.

13. The method according to claim 9, wherein
the information of the second EES is useable to indicates that the second EES matches first request information; and
the receiving, by the first device, the information of the second EES comprises:
  receiving, by the first device, the information of the second ECS from the first ECS;
  sending, by the first device, second request information to the second ECS, wherein the second request information is useable for requesting the information of the second EES; and
  receiving, by the terminal device, the information of the second EES from the second ECS, wherein the information of the second EES comprises address information of the second EES that matches the first request information.

14. The method according to claim 13, further comprising:
receiving, by the first device from the first ECS, a security credential useable for accessing the second ECS.

15. The method according to claim 9, wherein
the information of the second EES is useable to indicates that the second EES fails to matches first request information, and
the method further comprises:
  receiving, by the first device, first information from the first ECS, wherein the first information is useable for obtaining an endpoint of an application.

16. The method according to claim 9, wherein
the first device is the first EES, and
the method further comprises:
  receiving, by the first EES, third request information from the terminal device, wherein the third request information comprises the PLMN identifier of the second network.

17. A communication method, comprising:
receiving, by a second edge configuration server (ECS), first request information from a first ECS, wherein the first request information is useable for requesting information of a second edge enabler server (EES); and
sending, by the second ECS, the information of the second EES to the first ECS, wherein
the second ECS and the second EES correspond to the second network, the first ECS corresponds to a first network, the first network is a home network of a terminal device, and the second network is a serving network of the terminal device.

18. The method according to claim 17, wherein the first request information comprises at least one of location information of the terminal device in the second network or application information of the terminal device.

19. The method according to claim 17, wherein the information of the second EES comprises address information of the second EES that matches the first request information.

20. The method according to claim 19, further comprising:
sending, by the second ECS to the first ECS, a security credential useable for accessing the second EES.

* * * * *